(12) United States Patent
Pousti

(10) Patent No.: US 7,860,484 B2
(45) Date of Patent: *Dec. 28, 2010

(54) AUTOMATED BILLING AND DISTRIBUTION PLATFORM FOR APPLICATION PROVIDERS

(75) Inventor: Michael Pousti, San Diego, CA (US)

(73) Assignee: SMS.ac, Inc., San Diego, CA (US)

(*) Notice: Subject to any disclaimer, the term of this patent is extended or adjusted under 35 U.S.C. 154(b) by 644 days.

This patent is subject to a terminal disclaimer.

(21) Appl. No.: 11/702,954

(22) Filed: Feb. 6, 2007

(65) Prior Publication Data

US 2008/0057904 A1 Mar. 6, 2008

Related U.S. Application Data

(63) Continuation-in-part of application No. 11/516,921, filed on Sep. 6, 2006, now Pat. No. 7,826,829.

(60) Provisional application No. 60/714,978, filed on Sep. 7, 2005, provisional application No. 60/771,178, filed on Feb. 6, 2006.

(51) Int. Cl.
H04M 15/00 (2006.01)
H04M 3/00 (2006.01)

(52) U.S. Cl. ............... 455/406; 455/418; 455/414.1; 455/435.1

(58) Field of Classification Search ......... 455/405–408, 455/435.1–435.3, 550.1–556.2, 414.1; 705/34–45; 719/328–329
See application file for complete search history.

(56) References Cited

U.S. PATENT DOCUMENTS

2005/0240943 A1* 10/2005 Smith et al. ............... 719/328
2005/0289047 A1* 12/2005 Oliver et al. ............... 705/39
2006/0258397 A1* 11/2006 Kaplan et al. ............ 455/556.1

OTHER PUBLICATIONS

International Search Report for PCT/US2008/053070 mailed Aug. 19, 2008.
Notice of Allowance issued by the USPTO on Aug. 23, 2010 in related U.S. Appl. No. 11/516,921 (12 pages).
Supplemental Response to Office Action filed Jul. 13, 2010 in related U.S. Appl. No. 11/516,921 (33 pages).
Notice of Allowance issued by the USPTO on Aug. 25, 2010 in related U.S. Appl. No. 12/620,507 (11 pages).
Response to Office Action filed Jul. 14, 2010 in related U.S. Appl. No. 12/620,507 (19 pages).

\* cited by examiner

Primary Examiner—Kent Chang
Assistant Examiner—Kashif Siddiqui
(74) Attorney, Agent, or Firm—Procopio Cory Hargreaves & Savitch LLP; Noel C. Gillespie

(57) ABSTRACT

Systems and methods according to certain embodiments of the invention include integrating a network-enabled application with a platform having a plurality of users and a plurality of communication channels with a respective plurality of wireless network carriers. The systems and methods include providing a developer library for use by developers in creating their network-enabled applications.

25 Claims, 17 Drawing Sheets

MobilePartner

TestMeASAS

Become a Mobile Partner to create and manage your own mobile alerts. You can also use Mobile Payment Platform to charge users to view pages on your web site 1: Build your Mobile Product(s).
2: Schedule your Mobile Product(s).
3: Get paid for your Mobile Products(s).

Your thoughts are important to us. Please help us better serve you and your customers.
Provide Feedback Launch Tour | Download How-To PDF

Mobile Products

*click here*

Build Your Mobile Product

Create your own Mobile Alerts and utilize our system to charge customers directly to their example
Local Weather Report
A Mobile Alert sent 3-8 times daily detailing the weather report

Get paid to develop killer apps!

Build Your Mobile Pod

A Mobile Pod is a monitor-like application that runs on a user's Mobile Profile. More users sinsac
always connected Home | Get Started | Payout | Reports | Support | FAQ's | Tech Specs | Security Member Sign Out

Product URL: http://
Author Name:
Pricing: Tariff 25  Pay Out
Number of Messages: 1  Sent Per Month
Adult (18+) Content: ☐   content guidelines ~822

Optional Fields:

| Field Name | Type | Value | Required |
|---|---|---|---|
| Pizza | TextField | Pizza | ☑ ~824 |
| City | DropDownList | New York, San Diego, Detroit | ☑ |
| Team | Radio | Padres, Yankees, Tigers | ☑ | add more fields

Mobile Directory Category: Sports & Recreation ~826

Revenue Calculator
Understand the potential* earnings of your messages!
Messages Sent (monthly) per user: 1
Sent to - Country: United States    Carrier: Cingular Wireless
Revenue per msg: 0.165    Number of Users: 234    x Cost per User per Month: $0.3
Monthly Potential* Revenue Share = $38.61

~828

Mobile Products     AVAILABLE PRODUCTS BY THIS DEVELOPER

| ☐ | Product Name | Product Type | Description | Max | Pricing | Status | Manage |
|---|---|---|---|---|---|---|---|
| ☐ | funny mobile pod! | Mobile Pod | This is the funniest pod ever!!! | 4 | 1 | Active | Edit |

Deactivate Selected Products

~830

Summary of Service ~820

| | |
|---|---|
| | Mobile Facts |
| Company | BlackEvil |
| Type | Mobile Alert |
| Max Messages Daily | 4 ~872 |
| Pricing | $0.25 " ~870 |
| Rating | No ratings |
| Location | World Wide |
| Language | United States |
| Users | 2 |
| Created | 8/11/2005 |

Your mobile phone will be charged.

FIG. 8C

AUTOMATED BILLING AND DISTRIBUTION PLATFORM FOR APPLICATION PROVIDERS

CROSS-REFERENCE TO RELATED APPLICATIONS

This application claims the benefit of U.S. Provisional Patent Application Ser. No. 60/771,178, filed Feb. 6, 2006, entitled "AUTOMATED MOBILE PHONE BILLING AND DISTRIBUTION PLATFORM FOR APPLICATION PROVIDERS INCLUDING A DEVELOPER LIBRARY AND MUSIC POD APPLICATION", which is incorporated by reference herein in its entirety, including its specification and appendices. This application further is a continuation-in-part of U.S. patent application Ser. No. 11/516,921, filed Sep. 6, 2006, now U.S. Pat. No. 7,826,829 entitled "AUTOMATED BILLING AND DISTRIBUTION PLATFORM FOR APPLICATION PROVIDERS," which claims the benefit of U.S. Provisional Patent Application Ser. No. 60/714,978, filed Sep. 7, 2005. Both of these prior applications are incorporated by reference herein in their entireties.

FIELD OF THE INVENTION

The present invention relates to an automated distribution and billing platform for networked applications, and, more particularly, relates to programming add-ons for the development of the same.

BACKGROUND

While credit card use and automatic credit card billing is a common way to conduct business transactions in many countries, they are not necessarily the best way in some situations. In particular, there are many users of the internet that do not have access to a credit card or do not want to use their credit card for an internet based transaction out of security concerns. Many such users most likely have a mobile phone or mobile device, and it would be easy and efficient to have a mechanism for billing the user for transactions through the user's pre-existing account with the wireless network carrier associated with the user's mobile phone number. In addition, the use of a credit card is economically viable only if the transaction amount, or a volume of such transactions, exceeds a particular amount that depends on the underlying efficiency and cost of the billing and collecting system implemented by the merchant and by the credit card provider. Currently, wireless network carriers or satellite phone carriers routinely bill users for small transactional amounts, such as a one minute call, or portion thereof, and are able to bill and collect for these small transactions while making a profit. These small transactions are referred to as micro-transactions and, in terms of U.S. currency, can be as small as a few pennies, although larger transactions occur as well.

Retailers or vendors, such as internet commercial websites that provide products or services, may desire to provide their respective content or services to mobile phone users via the internet or directly through the user's mobile phone, and bill the user for such content or services as micro-transactions. For example, a third-party internet website may provide users with access to frequent summaries of sports game scores and news or other premium content, for a fixed price per month. Currently, a retailer or vendor will find it very difficult and inefficient to bill and collect for such a micro-transaction because the retailer/vendor would need to negotiate and enter into a contractual relationship with the user's wireless network carrier in order to bill the mobile phone user subscribed to that carrier. The process is further complicated by the fact that the universe of customers with mobile phones use different wireless network carriers. Accordingly, the retailer/vendor would need to enter into contractual relationships with each of the many different wireless network carriers in order to be able to provide a mobile phone based micro-transaction billing option to the desired global market of mobile phone users. A retailer or vendor can try to use billing mechanisms other than wireless network carriers, such as prepaid card services, web-based payment services, bank account and credit card billing services, and other such external billing mechanisms to support customer transactions. However, in such examples, the same problem still exists for the vendor/retailer because they would still need to have pre-existing relationships with all of the various external billing mechanisms that their various customers wish to use for payment of transactions. In addition, a retailer/vendor often finds it difficult to efficiently market their product/service to the users of each of the many different wireless network carriers.

Thus, there exists a need for retailers and vendors with networked applications to have the ability to easily market and conduct transactions, many of which may be micro-transactions, with a global market of mobile phone users, where the transactions are easily billable through a single intermediate billing platform which can effectuate a transaction through a wide variety of external billing mechanisms on behalf of the retailer/vendor, thereby eliminating the need for the retailer/vendor to establish an individual contractual relationship with each of the external billing mechanisms, while providing the retailer/vendor with efficient access to the global market. Moreover, there is a need for a system that may be conveniently employed by developers to make their applications accessible to the global market of mobile phone users.

SUMMARY

The present invention solves the foregoing problems by providing a system and method for retailers and vendors with networked applications to efficiently integrate their respective networked applications within a global market of mobile phone users, wherein the retailers and vendors can easily conduct transactions with the users, many of which may be micro-transactions, and the transactions are easily billable through a single intermediate billing platform which can effectuate a transaction through a wide variety of external billing mechanisms on behalf of the retailer/vendor. In this manner, there is no need for the retailer/vendor to establish an individual contractual relationship with each of the external billing mechanisms, and the retailer/vendor is instantly provided with efficient access to a global market of users.

In one aspect, the invention is directed towards a method for developing and integrating a network-enabled application with a platform having a plurality of users and a plurality of communication channels with a respective plurality of wireless network carriers, the method including: a request receipt step of receiving, at the platform, a request from a third-party provider to integrate a network-enabled application with the platform; a registration data receipt step of receiving, at the platform, a set of registration data corresponding to the network-enabled application from the third-party provider, the set of registration data including a link to an application location for accessing the network-enabled application; a database update step of updating a system database in the platform to include the set of registration data corresponding to the network-enabled application; and a development step of integrating at least one function or code-segment from a developer library associated with the platform into the network-enabled application.

Implementations of the invention may include one or more of the following. The method may further include an enablement step of enabling the network-enabled application to be accessible to the plurality of users via a networked interface operated by the platform. In the request receipt step, the request may be received from the third-party provider through a user interface operated by the platform. The user interface may be a webpage or an application downloaded from the platform, and may include access to the developer library. The developer library may include functions or code-segments relating to sending an email message, sending a text message, building a query string, forwarding a media file such as an audio or video file, or logging in. The developer library may be provided by the platform or by another user. The platform may include an application interface platform and, in the enablement step, the network-enabled application may be integrated with the platform via the application interface platform. In the enablement step, the networked interface may be an application webpage that is operated by the platform and that includes an application identifier corresponding to the network-enabled application, or may alternatively include an application that is downloadable from the platform to at least one mobile device. The network-enabled application may be selected from the group consisting of music data, video data, plaintext data or markup language data.

In another aspect, the invention is directed towards a platform for supporting a network-enabled application, including: a plurality of communication channels to a respective plurality of wireless network carriers, each of the wireless network carriers having a plurality of users; at least one processor; at least one interface having access to the internet; and at least one computer readable medium carrying one or more sequences of instructions for integrating the network-enabled application with the platform, wherein execution of the one or more sequences of instructions by the one or more processors causes the one or more processors to perform: a request receipt step of receiving, at the platform, a request from a third-party provider to integrate the network-enabled application with the platform; a registration data receipt step of receiving, at the platform, a set of registration data corresponding to the network-enabled application from the third-party provider, the set of registration data including a link to an application location for accessing the network-enabled application; a pricing structure data receipt step of receiving, at the platform, a set of pricing structure data corresponding to the network-enabled application from the third-party provider; a database update step of updating a system database in the platform to include the set of registration data corresponding to the network-enabled application and to include the pricing structure data corresponding to the network-enabled application; and a development step of integrating at least one function or code-segment from a developer library associated with the platform into the network-enabled application.

Implementations of the invention may include one or more of the following. The at least one computer readable medium may carry one or more sequences of instructions for integrating the network-enabled application with the platform, wherein execution of the one or more sequences of instructions by the one or more processors causes the one or more processors to further perform: an enablement step of enabling the network-enabled application to be accessible to the plurality of users via a networked interface operated by the platform. In the request receipt step, the request may be received from the third-party provider through a webpage operated by the platform. In the registration data receipt step, the set of registration data may be received from the third-party provider through a registration webpage operated by the platform. The platform may include an application interface platform and wherein, in the enablement step, the network-enabled application is integrated with the platform via the application interface platform. In the enablement step, the networked interface may be an application webpage that is operated by the platform and that includes an application identifier corresponding to the network-enabled application, or may includes an application that is downloadable from the platform to at least one mobile device. Execution of the one or more sequences of instructions by the one or more processors may cause the one or more processors to further perform a statistics collecting step of collecting statistics regarding one or more of the plurality of users who access the network-enabled application. The network-enabled application may be selected from the group consisting of music data, video data, plaintext data or markup language data. The developer library may include functions or code-segments relating to sending an email message, sending a text message, building a query string, forwarding a media file, or logging in. The developer library may be provided by the platform or by another user.

In another aspect, the present invention relates to a method and platform for integrating a network-enabled application with a platform having a plurality of users and a plurality of communication channels with a respective plurality of wireless network carriers, including receiving a request from a third-party provider to integrate a network-enabled application with the platform, receiving a set of registration data corresponding to the network-enabled application from the third-party provider, the set of registration data including a link to an application location for accessing the network-enabled application, receiving a set of pricing structure data corresponding to the network-enabled application from the third-party provider, updating a system database in the platform to include the set of registration data and the pricing structure data corresponding to the network-enabled application, and enabling the network-enabled application to be accessible to the plurality of users via a networked interface operated by the platform.

In another aspect, the present invention relates to a method and platform for billing a user for the use of a network-enabled application that is integrated with a platform having a plurality of users and a plurality of communication channels with a respective plurality of wireless network carriers. The invention includes detecting, in the platform, a billing event generated by the network-enabled application, the billing event containing an identification code corresponding to the user, validating, in the platform, the billing event generated by the network-enabled application by determining if the billing event is in accordance with a predetermined pricing structure corresponding to the network-enabled application, sending, in the case that the billing event is determined to be valid in the billing validation step, a billing message from the platform to an external billing mechanism (such as one of the wireless network carriers that corresponds to the user), the billing message containing a billing amount which the external billing mechanism is to bill the user, and discarding, in the case that the billing event is determined to be invalid in the billing validation step, the billing event from the platform.

Other aspects include providing an automatic cut-off feature which permits a particular application to be disabled from operation through the platform if a threshold number of user complaints have been received about the application. In this manner, the users of the platform have control through the platform to disable a disreputable or improper application. Also, in another aspect, the platform automatically evaluates a billable event from an application by comparing it to the specified terms and conditions of the corresponding pricing structure, and then will discard the billable event if it is in violation of the terms and conditions. In this manner, the platform provides automatic regulation to prevent improper activity or billing by an application that is accessed through the platform. Also, other billing mechanisms can be used rather than sending a billing message to the wireless network carrier of the user, such as the use of prepaid card services, web-based payment services, bank account and credit card billing services, and other such external billing mechanisms to support customer transactions.

Accordingly, it is unnecessary for the application provider to have contractual agreements with any of the wireless network carriers, because the billing is automatically performed by the platform through the wireless network carriers on behalf of the application providers. The platform requires the application providers to use a standardized pricing structure in order to provide a consistent experience for users of the applications that are accessed through the platform. The invention provides application providers with a simple, efficient and automatic way to register and present their applications to a large community of users through the platform.

It is understood that other embodiments of the present invention will become readily apparent to those skilled in the art from the following detailed description, wherein is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive

BRIEF DESCRIPTION OF THE DRAWINGS

FIG. 5 is a block diagram depicting a webpage for developing a network-enabled application, according to one embodiment of the invention;

FIG. 8A is a block diagram depicting a first portion of a webpage for entering information related to a network-enabled application, according to one embodiment of the invention;

FIG. 8B is a block diagram depicting a second portion of a webpage for entering information related to a network-enabled application, according to one embodiment of the invention;

FIG. 8C is a block diagram depicting a summary display of information and pricing related to a network-enabled application, according to one embodiment of the invention;

DETAILED DESCRIPTION

Figure 2:
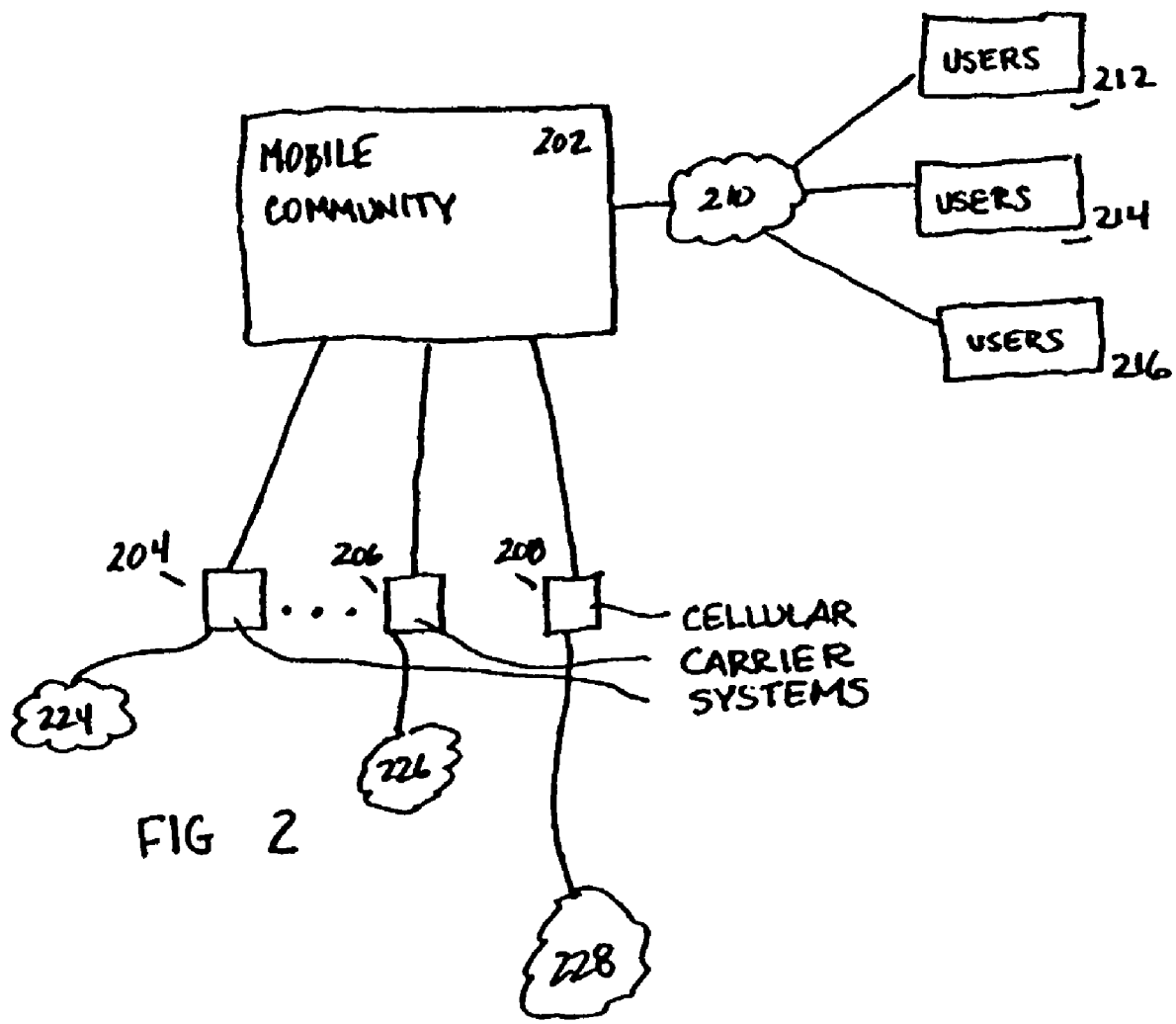
FIG. 2 is a block diagram of a wireless network environment in which the invention may be practiced, according to one embodiment of the invention.

FIG. 2 depicts a block diagram of a computer-based platform 202 in which the invention is practiced, according to one embodiment. Users 212, 214, 216 can connect to platform 202 via a network or similar communications channel 210. Via the connection, a user (e.g., 212) may create a profile page or "home page" or "mobile home page (MHP)" that they can personalize. This profile page can include various files and content that the user wants to share with other members of platform 202.

The profile page may include a hierarchy of pages, some of which are for public view and some of which have restrictions on viewing (private). For example, platform 202 can be logically organized into neighborhoods such as "friends", "family", "workplace", "dog owners", etc. Users 212, 214, 216 can belong to these different neighborhoods and share different pages or groups of pages with the members of the different neighborhoods.

As seen in FIG. 2, platform 202 connects with various wireless network carrier systems 204, 206, 208, each of which has an associated community of wireless network subscribers, 224, 226 and 228, respectively. In this regard, each of wireless network carrier systems 204, 206, 208 is a carrier network and system for supporting mobile devices including mobile phones and other mobile devices such as personal device assistants (pda). Each wireless network carrier system is generally a wireless network provider, which can be cellular, PCS, or other wireless spectrum. Users 212, 214, 216 of the platform 202 are also subscribers of one or more of the various wireless network carriers, which support the mobile phones, or other mobile devices, of users 212, 214, 216. In this way, users 212, 214, 216 of platform 202 can access other users' profile pages through the computer-based platform of platform 202, and they can also access the subscribers 224, 226 and 228 of the various wireless network carrier systems 204, 206, and 208 who also belong to platform 202.

A significant benefit of the architecture depicted in FIG. 2, is that the platform 202 has pre-existing contractual relationships with the various wireless network carrier systems 204, 206, 208 for accessing subscribers through each carrier systems and for billing subscribers through their respective carrier system for content and services purchased by the subscriber through platform 202. As is known in the art, the wireless network carrier systems 204, 206, 208 provide text messaging and also premium text message functionality. Such messages are sent via the wireless network carrier's infrastructure to its mobile subscribers and, internal to the wireless network carrier's infrastructure, the sending of such a message generates a billing event according to a particular tariff rate, which then is added to the subscriber's bill from that wireless network carrier. In another billing mode, the subscriber is pre-paid by a certain pre-paid amount with the wireless network carrier, and the sending of such a message in this billing mode generates subtracts an amount corresponding to a particular tariff rate from the pre-paid amount of the subscriber's account.

When platform 202 sends a message via a wireless network carrier system (e.g., 204), it is billing the subscriber-recipient of the message using the existing billing system of that wireless network carrier. The billing event is often a micro-transaction of a small monetary amount (e.g., one involving only a few cents, or less than one dollar, although any value transaction could conceivably be involved). Thus, a user (e.g., 212) of the platform may purchase a service or content within platform 202 and be billed for those transactions through that user's wireless network carrier service account. The present invention provides for such micro-transaction billing support through platform 202 for a transaction between a user (e.g., 212) and an application provider. In this manner, an application provider need only communicate with platform 202 to conduct transactions with users, and does not require any affiliation or agreement with the various wireless network carrier systems of the users. As mentioned above, other billing mechanisms can be used by the platform rather than billing the user through the wireless network carrier of the user, such as prepaid card services, web-based payment services, bank account and credit card billing services, and other such external billing mechanisms to support customer transactions.

Figure 3:
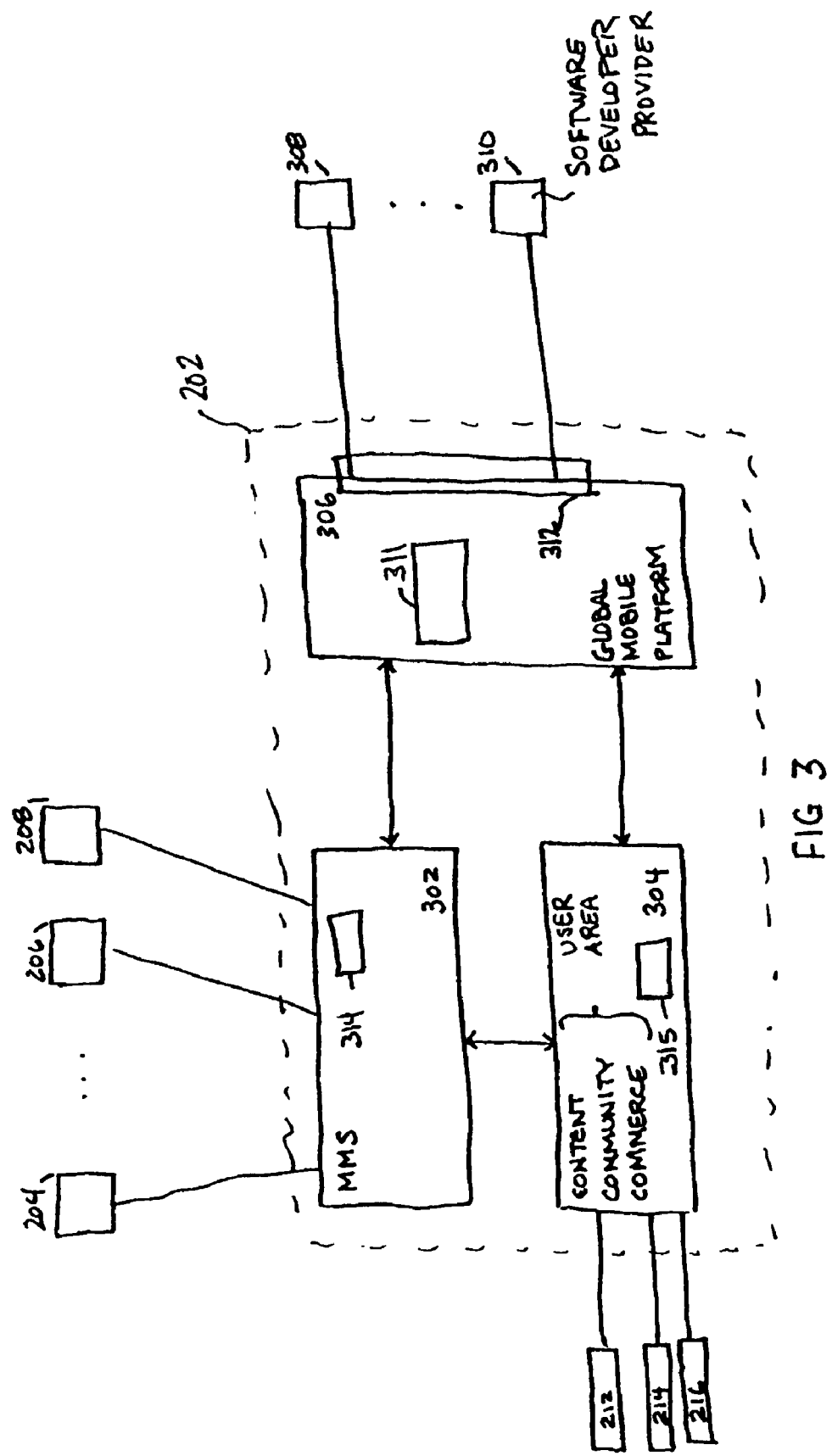
FIG. 3 is a block diagram providing a detailed view of the platform shown in FIG. 2.

FIG. 3 depicts a more detailed view of the high-level system view of FIG. 2. In particular, the system of FIG. 3 can be used to conduct micro-transactions in which a wireless network carrier's billing system is used by the platform 202 to automatically bill the user for each micro-transaction with a vendor/retailer through an application, without the need for a negotiation or contract between the vendor and the wireless network carrier. One example of this feature is that of information distribution where application developers can offer information, such as stock quotes, to the users of the platform 202 through applications while taking advantage of the billing arrangements already in place between the platform 202 and the wireless network carriers 204, 206, 208. Of course, an application may provide any other type of content or service to users of platform 202, such as information, communication, games, etc.

Some of the sub-components of the platform 202 are a developer's interface 306, the user area 304 where the content, community and commerce functions are handled for the users, and a multimedia messaging system (MMS) 302. The details of these different sub-components are more fully explained throughout the remainder of this detailed description.

As noted earlier, users 212, 214 and 216 can visit the user area 304 to participate in an on-line community that includes various content and commerce opportunities. This is typically accomplished via a user's web browser which may be run from a laptop or desktop computer, or, in the alternative, even on the user's mobile device such as a PDA, mobile phone, or other mobile device. Thus, the user area 304 includes a web server that communicates with users 212, 214, 216 and includes a data store of user information and other content, and also includes databases and records. With these resources, the platform 202 is able to present to a user 212 a profile page ("home page") that reflects content and information associated with, and desired by, that particular user. This content and information is not maintained on the local computer being used by the user 212 but, rather, is maintained and managed by the computer systems within the user area 304.

Although not explicitly depicted in FIG. 3, one of ordinary skill will recognize that there are numerous functionally equivalent techniques to create, manage, store and serve user information, user profiles, user content, software tools and other resources within the user area 304. Included in these techniques are methods to ensure security, data integrity, data availability and quality of service metrics. In the present exemplary embodiment, user 212 is illustrated connecting to user area 304 with a desktop computer, user 214 is illustrated as connecting to user area 304 via a wireless connection (dotted line) from a notebook computer, and user 216 is illustrated as connecting to user area 304 via a wireless connection (dotted line) from a mobile device. As will be apparent to one of ordinary skill in the art, however, the scope of the present invention is not limited to these particular devices, but rather encompasses any network-enabled device using any network connection technique to connect to a user area.

The multimedia messaging system 302 includes applications for connecting with and communicating with the multiple different wireless network carriers 204, 206, 208 that have been partnered with platform 202. The MMS 302 is configured to generate message requests in the appropriate format for each of the wireless network carriers 204, 206, 208 including tariff information that determines the amount for which the recipient of the message will be charged. Upon receipt of the message request, the wireless network carriers 204, 206, 208 will use the information in the request to generate an appropriate message to the intended recipient/subscriber of the wireless network carrier and then bill the recipient/subscriber's wireless network service account for the specified amount.

The MMS 302 communicates with the user area 304, such that users of the platform 202 can advantageously use the pre-existing connectivity of the MMS 302 with the wireless network carriers in order to send messages to subscribers of any of the wireless network carriers 204, 206, 208. The messages may be SMS messages, MMS messages, or other message formats that are subsequently developed. Some of these messages may have zero tariff and, therefore do not generate a bill (other than the underlying charges implemented by the wireless network carrier) and others may have non-zero tariffs resulting in a billing event for the recipient user.

The developer's interface 306 provides a link between application developers/providers 308, 310 and the platform 202. In particular, using an interface 312 (described in more detail herein), an application provider 308, 310 may offer services and products to users 212, 214, 216. Advantageously for the application provider 308, 310, the developer's interface 306 also provides automatic and instant connectivity to the wireless network carriers 204, 206, 208 via MMS 302. Accordingly, the application provider 308, 310 can interact with all users of the platform 202 through which billable transactions with users 212, 214, 216 are automatically billed via the billing systems of the wireless network carriers 204, 206, 208, on behalf of the application provider. Furthermore, and importantly, this capability is available to the application provider 308, 310 without requiring the application provider 308, 310 to negotiate or contract with any wireless network carrier for billing arrangements, or to worry about how to communicate with a wireless network carrier's systems and resources. The application provider seamlessly takes advantage of the unified set of connectivity and billing arrangements that exist between the platform 202 and the wireless network carriers 204, 206, 208. Thus, in addition to the contractual arrangements and affiliations the platform 202 has in place with different wireless network carriers 204, 206, 208, the underlying technical and communications infrastructure is also in place to communicate with and interoperate with each of the different wireless network carriers 204, 206, 208. As a result, application providers (vendors) and other users of the platform may interface with and operate with any of the users of a variety of different wireless network carriers without difficulty.

While developer's interface 306 has been described as running on a computer-based platform, the scope of the present invention is not limited to such an arrangement. Rather, as will be apparent to one of skill in the art, the present invention has application to any one of a number of arrangements in which a developer's interface provides a link between application developers and the platform 202.

While the terms "application provider" and "user" have been used to distinguish those who provide content from those who enjoy it, it will be easily understood by one of skill in the art that a single person may be both a user and an application provider. Indeed, as the present invention renders the registration of an application so simple, many users of platform 202 will be motivated to become application developers as well, further increasing the amount and variety of content available via platform 202.

While some applications that are available to users 212, 214, 216 may be hosted in the user area 304, the developer's interface 306, or elsewhere in the platform 202, it is often the case that the application developer/provider 308, 310 will host their own application at their own remote location. Accordingly, in the description that follows, even if a remotely-hosted application is being discussed in a specific example, one of ordinary skill will readily appreciate that an application being hosted differently is also expressly contemplated.

Figure 4:
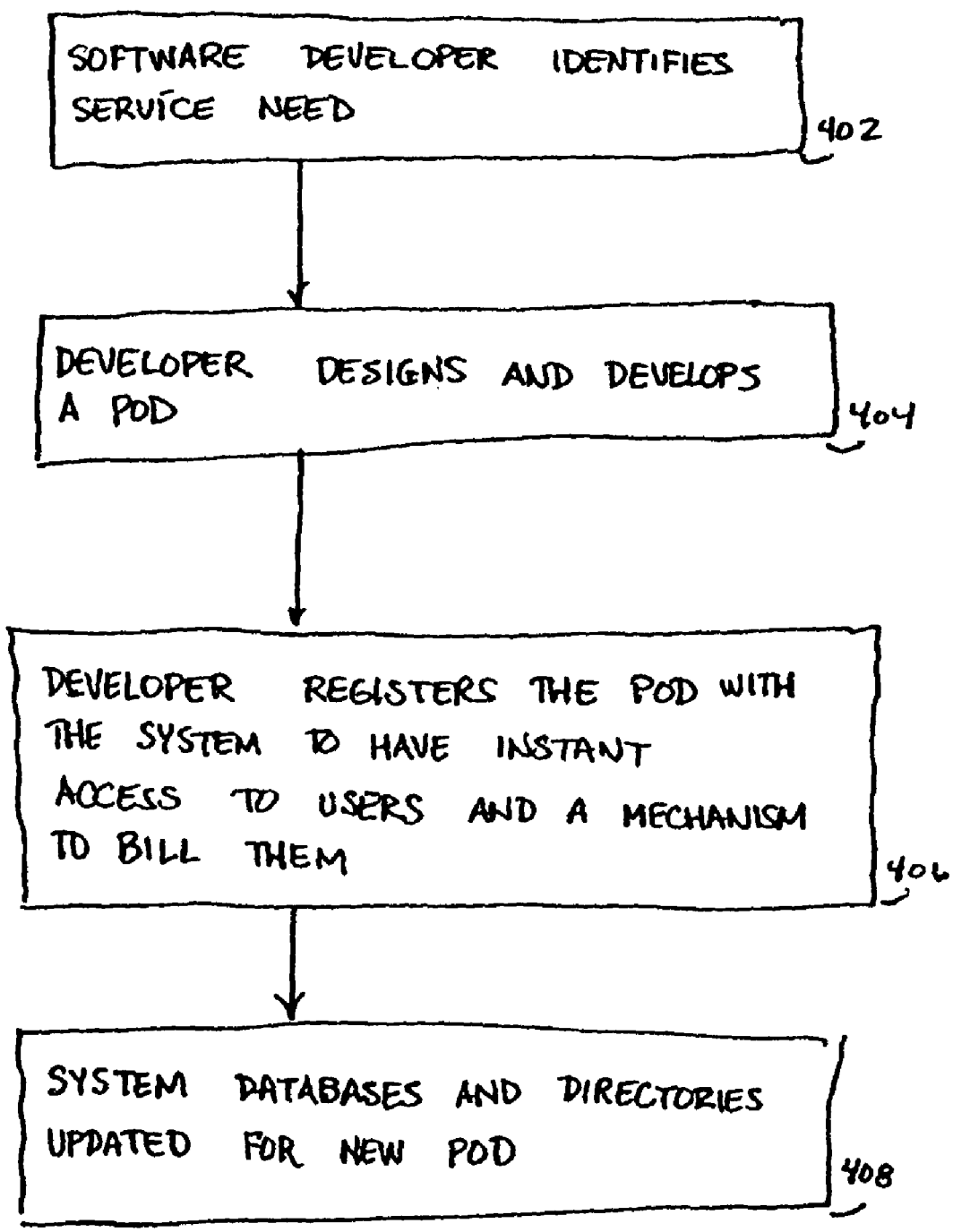
FIG. 4 is a flowchart for explaining the integration of a network-enabled application, according to one embodiment of the invention.

FIG. 4 depicts a flowchart of an exemplary method for integrating applications with the platform architecture of FIG. 2. In a first step 402, an application developer identifies a marketplace need that is not being fulfilled. In other words, the application developer believes that there is a service or product that they can provide to networked users that will be profitable to the developer. The variety of different types of services, content and products that can be offered to users via an application is limited only by the imagination of the different application developers. Moreover, the invention is not limited just to software applications. That is, a premium message and the billing therefore may be employed to pay for any number of tangible or intangible products. For example, a vending machine may be made part of the network, and the system may be employed to pay for products from the vending machine. The same is true of point-of-sale terminals at a "brick and mortar" retail store, as well as at an internet storefront.

The term "pod service" or "application" is used in the following description as a label for an application offered through platform 202, which provides a service or product. This label is used merely for convenience and is not intend to limit or restrict the types, variety and capabilities of potential applications in any way. As used herein, the term "pod" refers both to the underlying information related to the application and to the graphical rendering of the application on a user's profile page within the platform 202.

Once the marketplace is identified, the developer commences development of their application in step 404. The underlying application logic is up to the developer and can utilize any of the widely known programming environments and techniques available to one of ordinary skill in this area. However, the application will be offered within the platform 202 along with a variety of other applications. Accordingly, standardizing the look and feel of the application and information about the application will aid the users 212, 214, 216 and make their user experience more enjoyable and consistent.

Once an application has been developed (and most likely tested and verified) by a developer, the developer registers, in step 406, the application with the platform 202 through developer's interface 306. Registering the application, which is described in more detail later with reference to a number of screenshots, allows the application developer to inform the developer's interface 306 that a new application is available for integration with and subsequent access through platform 202.

Once an application is registered, the developer's interface 306 updates, in step 408, system databases and directories (provided in storage 311) for the new application and its associated information. In the above description of FIG. 4, it is evident that the application developer communicates with the platform 202 for a number of different reasons. One of ordinary skill will recognize that these various communications between the application developer and the platform 202 can occur via any of a variety of functionally equivalent means. For example, both wired and wireless communication methods for these communications are explicitly contemplated within the scope of the present invention.

Figure 6:
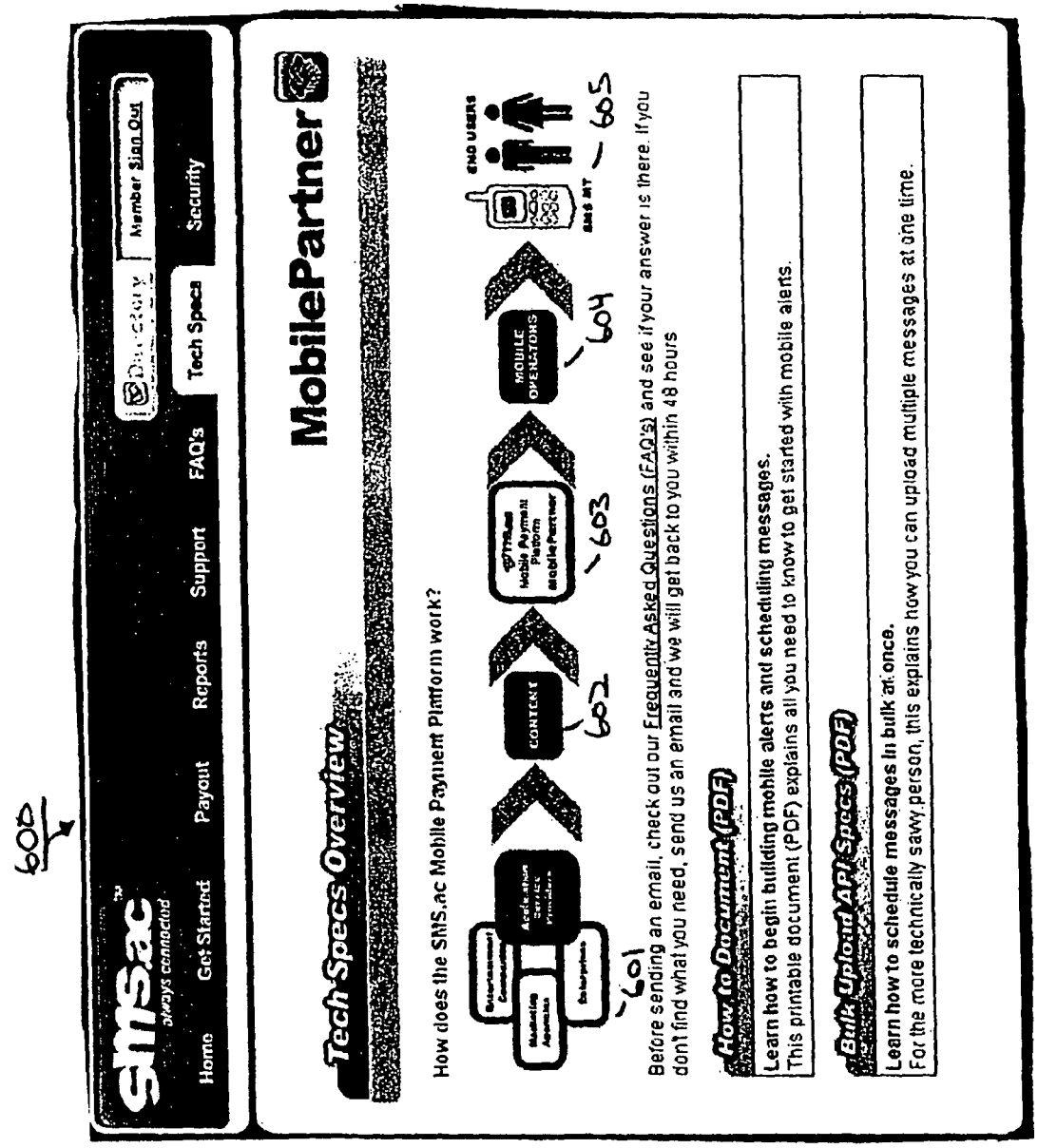
FIG. 6 is a block diagram depicting a webpage for explaining the integration of a network-enabled application, according to one embodiment of the invention.

FIG. 5 is a screenshot of an exemplary screen 500 that application developers may be presented with via the Internet by platform 202 to assist in registering a new application. From this screen 500, the application developer can navigate to a screen that provides more technical information such as the one shown in FIG. 6. This screen 600 of FIG. 6 illustrates to the developer how the application takes advantage of the existing payment mechanism of platform 202 when used by an end user.

Figure 7:
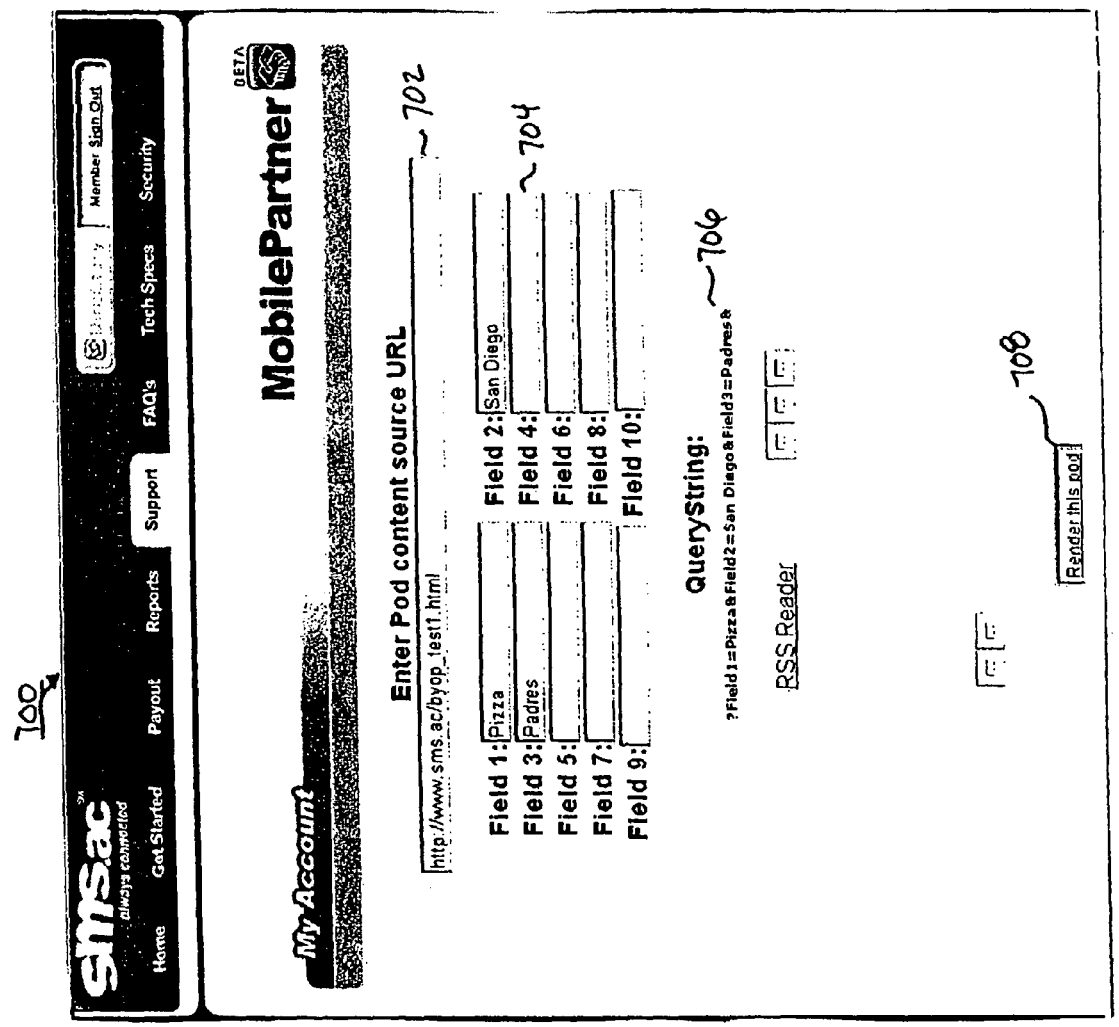
FIG. 7 is a block diagram depicting a webpage for entering information related to a network-enabled application, according to one embodiment of the invention.

FIG. 7 is a screenshot of an exemplary application registration screen 700 according to one embodiment of the present invention. Because the application is most likely hosted remotely, an input window 702 allows the application developer to provide the URL of where the application is located. When a user ultimately accesses and uses the pod through the platform 202, this URL is the location from where the content for the application is retrieved. For example, if the application was developed to display pictures for a dating service, this URL would point to code that when executed could detect user input events and result in the display of appropriate images.

The pod developer can utilize the field input boxes 704 to specify different fields that can capture input when a user first accesses a pod. For example, if an application is developed to provide stock quotes, then these fields could be defined to accept stock symbols. When the user views the pod within their profile page, these fields can be filled in with appropriate stock symbols, for example. Then, when the user then selects a "submit" button on the pod, this information is sent to the application developer's computing device which returns the appropriate information.

As is well known to HTML and HTTP developers, based on the information that is filled in the field windows 704, a particular query string will be appended to a request received from a user's form submission. To aid a developer in registering a pod, this query string is automatically generated and displayed for the pod developer in region 706 of the exemplary screen. To give the pod developer a quick view of how the pod will be rendered, a button 708 is provided to illustrate the pod. With this information, the developer may choose to revise their design.

Figure 8A:
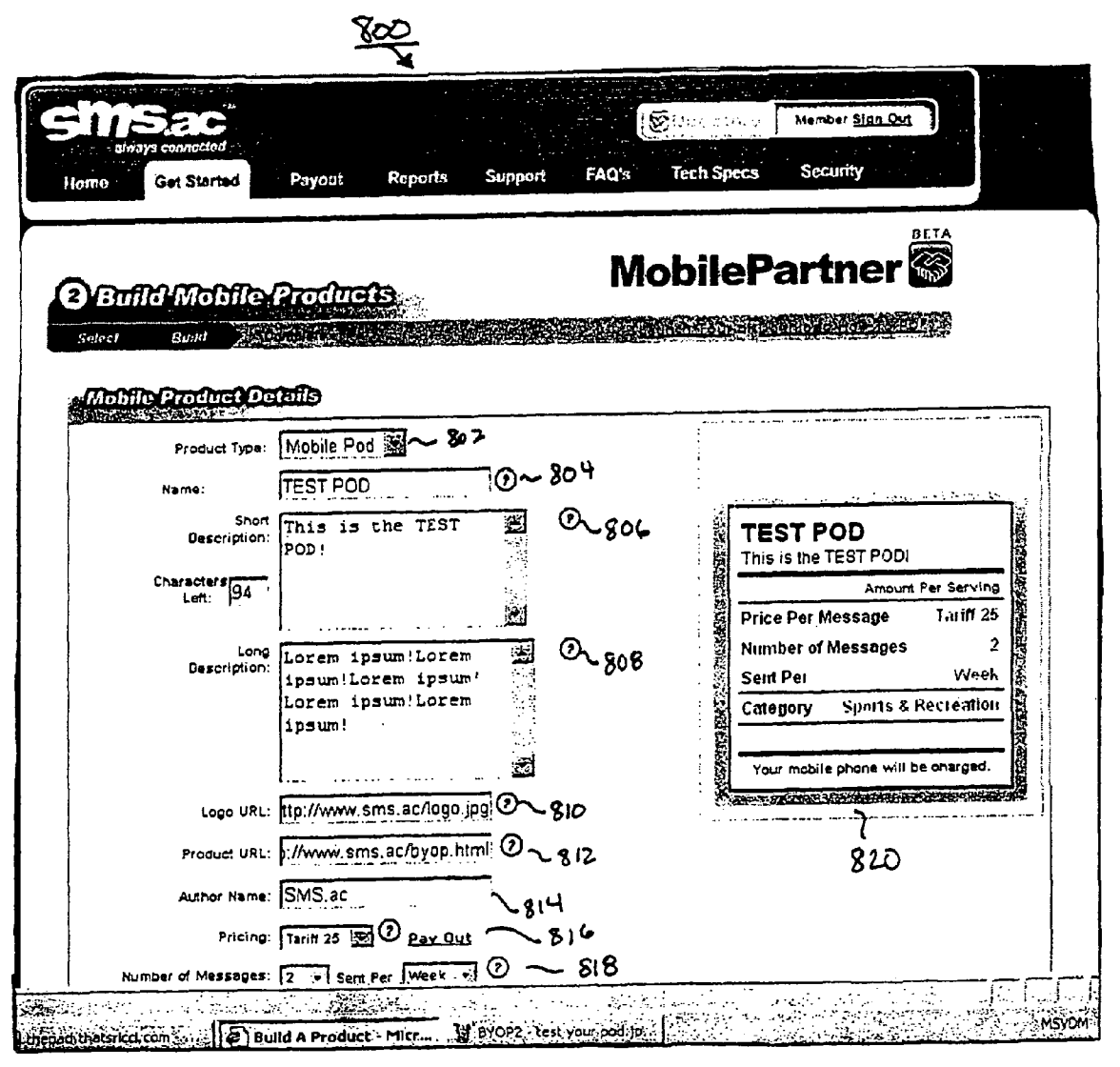

Once this initial information is collected, the developer's interface 306 collects additional information that is associated with the pod. FIGS. 8A and 8B depict the first half screen 800 and the second half screen 801 of a registration webpage for inputting registration, in which a number of input fields 802-830 are provided for the pod developer to fill in while registering their application. Many of these fields are self-explanatory; however, some warrant a more detailed discussion. In particular, a pricing window 816 is available for the developer to select an appropriate pricing scheme, according to a standardized pricing structure. According to one embodiment of the present invention, pricing occurs in fixed tariff bands. For example, one band would be a $0.25 band and would be used for products or services that the developer thinks users would purchase for around $0.25. Another band may be $1.00 and would be for higher priced items and still other bands can be used as well. According to this arrangement, not all prices are available to the developer; instead, the developer picks the closest band to use (e.g., the $1.00 band is selected even if market research shows users would actually pay $1.03 for the service).

Additionally, the application will likely be used by people in different countries. Because of the vagaries of global economics, $0.25 may be too high of a price-point in many countries. Thus, it is more appropriate to set a price-point for each separate country from which the application may be used. While it is possible for the developer's interface 306 to permit the pod developer to set such a vast number of price-points, most developers will not have the knowledge or the patience to perform such a task. Accordingly, the developer's interface 306 automatically provides a price band selection for each country based on their respective costs of living. In other words, a developer can select a price band in the currency that he is comfortable with and let the developer's interface 306 translate that to an equivalent price band in each country.

Via the input field 818, the developer also specifies the number of messages and frequency that their application will send to each user. Based on their knowledge of having developed the application to perform a particular service, the pod developer may, for example, know that no more than 4 messages per day (per user) will be sent from their application. This information sets the terms and conditions for billing the user. Thus, they would fill in this field 818 accordingly. As explained later, the developer's interface 306 can use this information to control message traffic within the platform 202.

The benefit of specifying the pricing information and number of message information is that the terms and conditions of the application can be provided to a user in a uniform manner. Window 820 displays, for the pod developer, how the application information, including pricing, terms and conditions, will be shown to a user. FIG. 8C depicts a more detailed view of this uniform pricing display 820. Much, like nutritional labels on food products provide a uniform format for presenting the nutritional information, the format depicted in window 820 can be used to uniformly present information about applications. Thus, a user of the platform does not have to learn to interpret different pricing information for each different pod developer. Instead, the uniform format 820 simplifies understanding this information. The exemplary format of window 820 includes a variety of information about the application. Of particular interest to most users is the uniform manner in which the pricing information 870 and the message information 872 is clearly presented. One of ordinary skill will appreciate that the format of window 820 is merely exemplary in nature and can vary in numerous ways without departing from the scope of the present invention. Accordingly, the exemplary format of window 820 is provided to illustrate that the developer's interface 306 is arranged so as to provide users of the platform 202 with uniformly formatted information from a variety of different applications so as to simplify the evaluation and comparison of different offerings. With such a uniform pricing arrangement being utilized, it becomes possible to monitor the behavior of pod developers with respect to their specified pricing structure and implement control measures such as limiting or restricting their activities with users of the platform if warranted.

Once the information of screens 8A and 8B are submitted to the developer's interface 306, the application is registered with the platform 202. According to at least one embodiment of the present invention, the application is evaluated by a moderator of the platform 202 to ensure it is acceptable from a technical and content point of view for the platform 202. In this scenario, the application is not registered until the evaluation is completed satisfactorily.

Information about a registered application is stored within the developer's interface 306 in such a way that when a user wants to include a pod on their profile page, the pod can be rendered using the stored information and interaction between the pod and user will occur based on the stored information as well. In such a case, the data associated with the user will be updated to reflect that the user is now accessing and using the pod.

Thus, according to the previously described technique, a pod developer can automatically register a new application (even from a remote location) without difficulty in such a way that the pod automatically becomes available to users of the platform 202 at the conclusion of the registration process. Furthermore, from the pod developer's point of view, the application may immediately take advantage of the access to all users of platform 202 and to the billing platform used by the platform 202 without the need to have existing contracts in place with any of the wireless network carriers.

Once registered, the application is made accessible to the users of platform 202 via a networked interface operated by the platform. For example, according to one aspect, the network-enabled application is integrated with platform 202 via the application interface platform. According to another aspect, a message communication channel is established between the network-enabled application and the message management system. According to yet another aspect, the networked interface is an application webpage that is operated by platform 202 and that includes an application identifier corresponding to the network-enabled application. According to yet another aspect, the networked interface is an application webpage that can be downloaded to a user's mobile device, such as a mobile phone, personal device assistant (pda), smartphone, handheld gaming device, Blackberry®, ultra-mobile PC (UMPC), or any one of a number of other mobile devices known to those of skill in the art.

One benefit of registering applications in this manner is that once registered, the developer's interface 306 can prevent the terms and condition information from being subsequently changed by the pod developer. Thus, a user's agreed upon price and operating parameters when initially subscribing to the application will not later be modified (with or without their knowledge).

The users of the platform can locate available applications in a number of different ways. First, the platform 202 facilitates sharing of information by users having common tastes. Accordingly, users frequently visit other users' profile pages looking for interesting applications, content and information, particularly with neighborhoods to which the user belongs. During this visiting of other members' home pages, a user can discover an interesting pod and want to access it for themselves. In terms of the platform, a user "owns" their own profile page and is called an "owner" when at their profile page. In contrast, when a user visits another user's profile page, they are considered a "viewer". Within the platform 202, the profile pages are maintained such that the view by an owner may not always correspond to that seen by a viewer as the owner may want some information to be private and other information to be public.

In another instance, a user may know a friend or colleague would want a particular application; thus, the platform 202 allows a user to inform another user about the existence of a new application. Another way in which applications are located is via a directory within the platform 202. For example, the developer's interface 306 registers each application as the developers submit them; it is a simple extension to include a database update and a searchable-directory update as part of the registration process (see step 408 of FIG. 4).

While the exemplary embodiment discussed above has described the registration of an application using an Internet-based webpage, the scope of the present invention is not limited to this particular arrangement. Rather, as will be apparent to one of skill in the art, an application may be registered by a developer by providing the requisite information in any one of a number of functionally-equivalent manners. For example, and without limitation, a developer may register a new application by sending an appropriately formatted text-message or email to a server configured to parse the information therein.

For purposes of this specification, the term "application" should be understood to encompass not only executable program code, but rather includes any data by which content is provided to a user. For example, according to one aspect of the present invention, an application registered by an application provider or uploaded by a user may be as simple as a multimedia file or content stream for providing music and/or video to a user's mobile device or computer. Alternately, an application may be a plaintext or markup language file or content stream such as an HTML-formatted web log ("blog") or an aggregated news feed (e.g., RSS or ATOM). As will be apparent to one of skill in the art, the present invention has application to any one of a nearly limitless number of content types which may be provided over a network.

Figure 9:
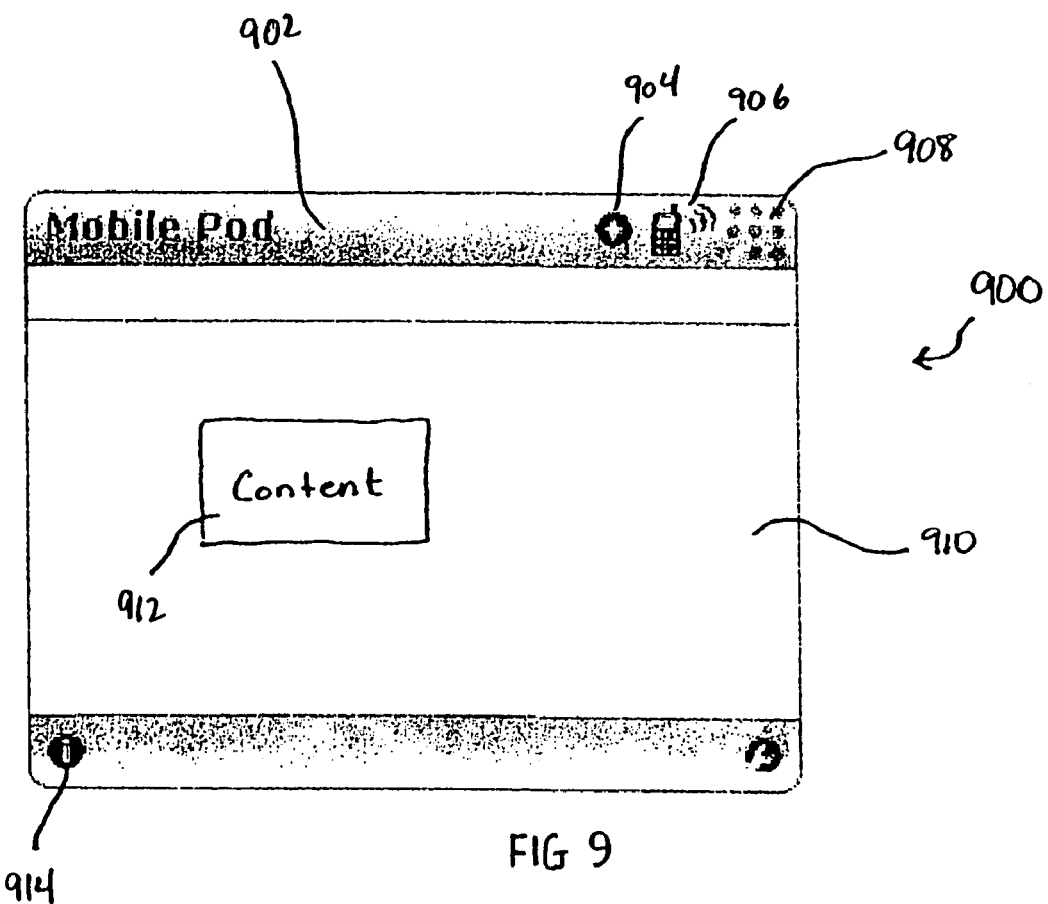
FIG. 9 is a block diagram depicting an application, according to one embodiment of the invention.

A rendering of an exemplary pod 900 is depicted in FIG. 9. The pod includes a title bar 902 with a number of icons 904-908. The main window 910 of the pod is where the content 912 is displayed. This content is based on the associated application and the stored system information associated with this pod. From the pod 900, a user launches an initial message to the associated application. In instances where the application provides content back to the pod 900, the window 910 is updated. By using remote scripting capability, as is known in the art, the updating of window 910 can occur without the user manually refreshing the window 910. Similar to the profile pages described earlier, the pod 900 can be designed to provide different views of content 912 to a user depending on whether the user is an "owner" or a "viewer".

The icon 904 can be selected by a user (for example, when viewing someone else's pod) to add that pod to their own profile page. The icon 906 can be selected to inform another user about this pod and a drag icon 908 can be used to move the pod around a user interface screen. The "information" icon 914 is useful for displaying information about the pod, including the uniform pricing information described earlier.

Figure 10:
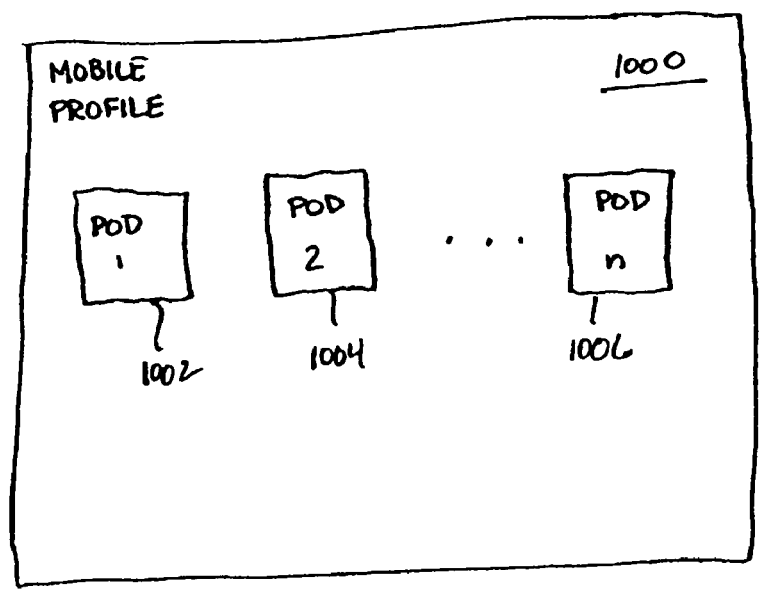
FIG. 10 is a block diagram depicting a profile webpage, according to one embodiment of the invention.

FIG. 10 depicts an exemplary user profile page 1000 that has arranged thereon a plurality of applications 1002, 1004, 1006. In this manner, the pods available to a user can be displayed on their profile page. As noted earlier, the user can access this profile page via a number of different devices and/or networks. For example, in addition to use of a traditional web browser, a portable device such as a smart phone or PDA can be used to access the profile page and pods. Such portable devices can utilize traditional WAP-based or HTML-based network connection techniques to access the pods through a network, such as a local intranet or a wide area network such as the internet, but they may also utilize device-based applications with proprietary network protocols specifically developed to advantageously utilize the capabilities provided by pods and applications, including currently-existing ones as well as those developed in the future. For example, according to one embodiment of the present invention, an ad-hoc wireless network created on-the-fly between the mobile devices of several users may be used to share profile pages and/or pods without relying upon a web-based network. In such an embodiment, one mobile user may be able to access a pod hosted on the mobile device of another user. As will be apparent to one of skill in the art, the scope of the present invention is not limited to the particular networks and/or devices described above, but rather includes any network-enabled device and any network connection technique used to connect such a network-enabled device to any type of network.

Figure 11:
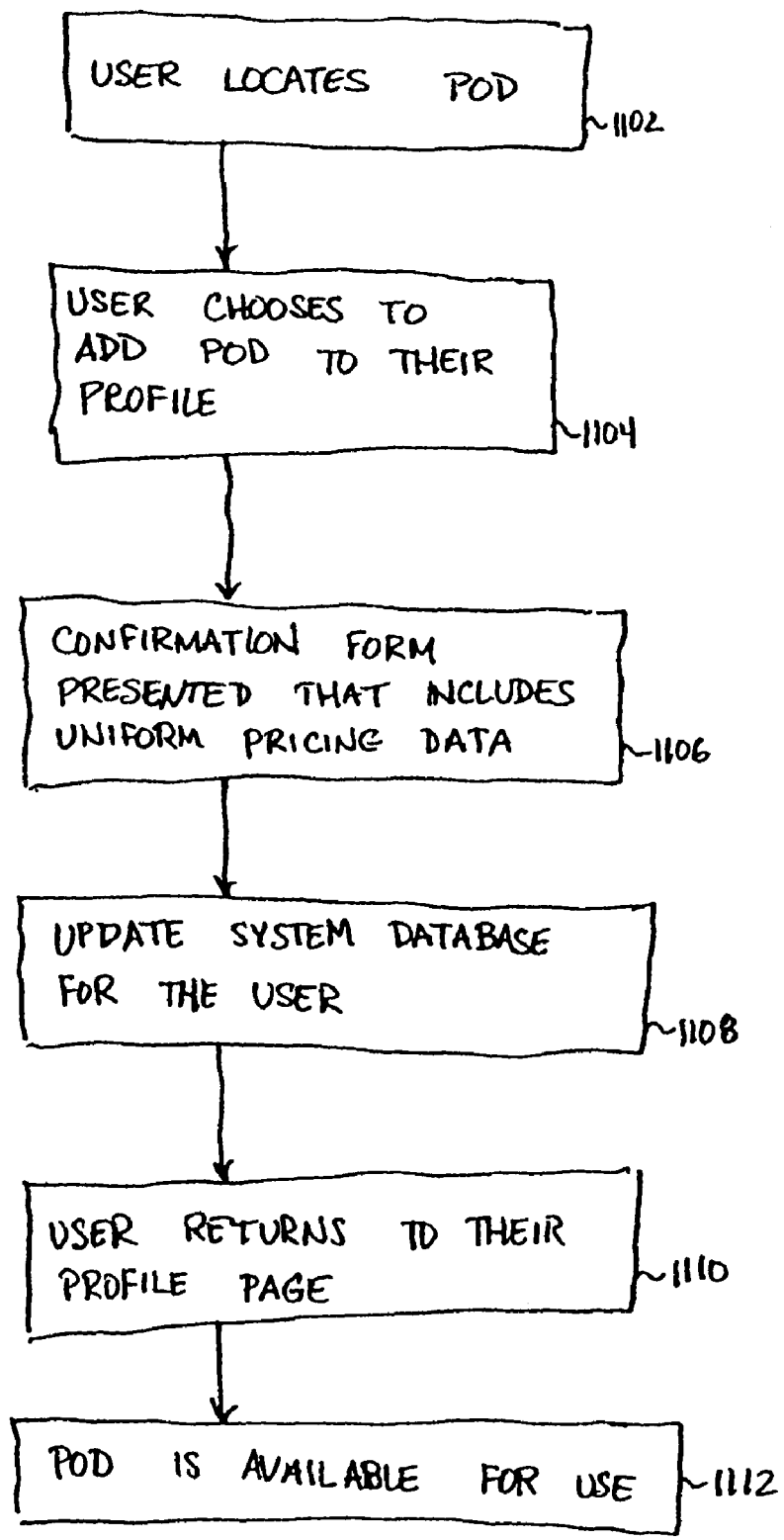
FIG. 11 is a flowchart for explaining the subscription of a user to a network-enabled application, according to one embodiment of the invention.

FIG. 11 illustrates a flowchart of an exemplary method for a user to add a pod to their profile page. In step 1102, the pod user locates an interesting pod via a visit to another user's profile page or through a directory search. In evaluating the pod, the user can see the terms and conditions of the pod in the uniform presentation format described earlier. Next, in step 1104, the user chooses to add the pod to their profile page; typically using a standardized feature on the pod. In step 1106, a confirmation page is sent to the user to ensure they know the pricing information about the pod and to ensure they are aware of the likelihood of their wireless network service account being billed as a result of executing the application. Assuming the user confirms their selection, the user area 304 updates, in step 1108, its data store 315 about this user such that the records indicate the user owns this new pod on their profile page. When the user next visits their profile page, in step 1110, and as a result of the user area 304 rendering their profile page on their browser, the new pod will be displayed. With the pod displayed within the profile page, it is now available for use by the user, in step 1112.

Figure 12:
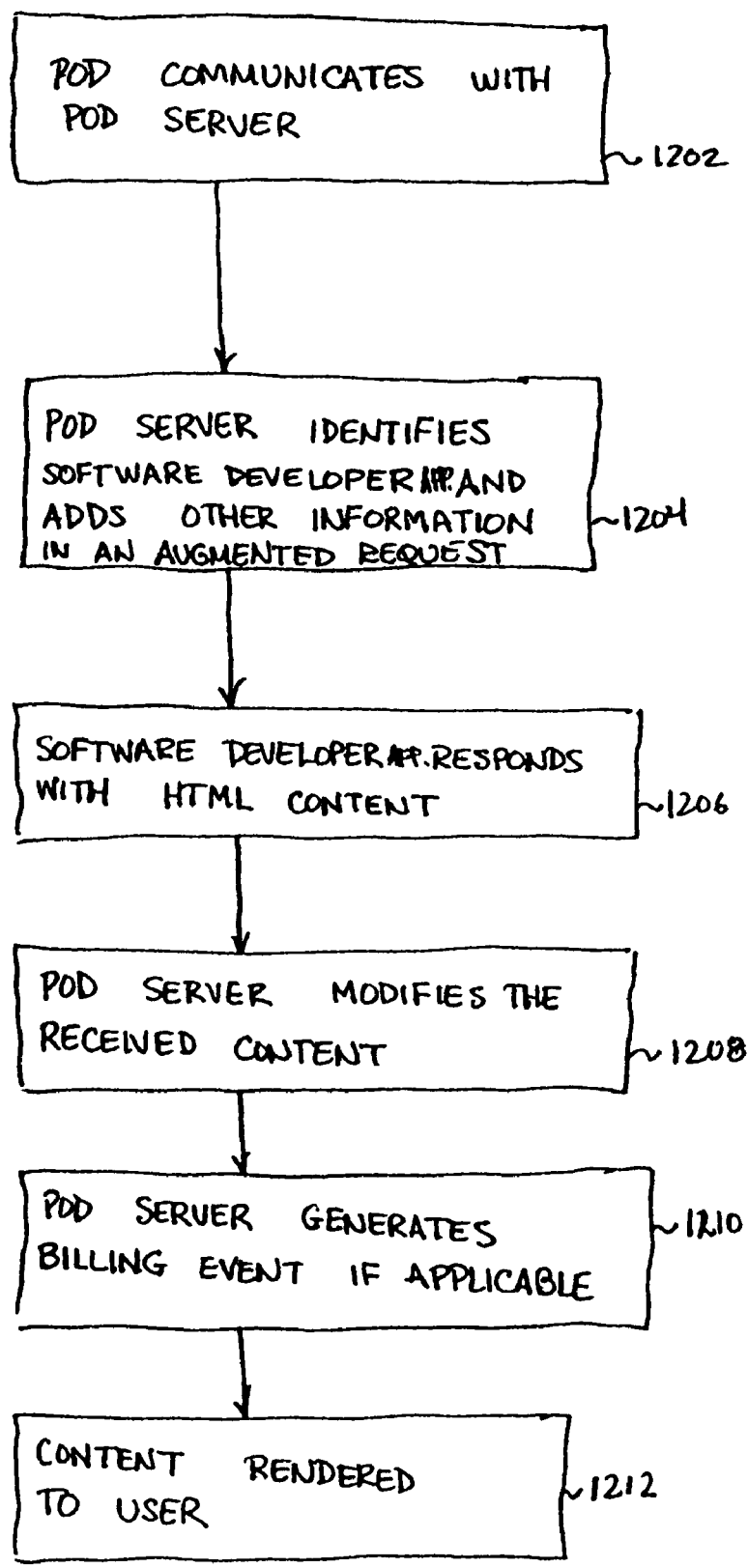
FIG. 12 is a flowchart for explaining the operation of a network-enabled application, according to one embodiment of the invention.
Figure 13:
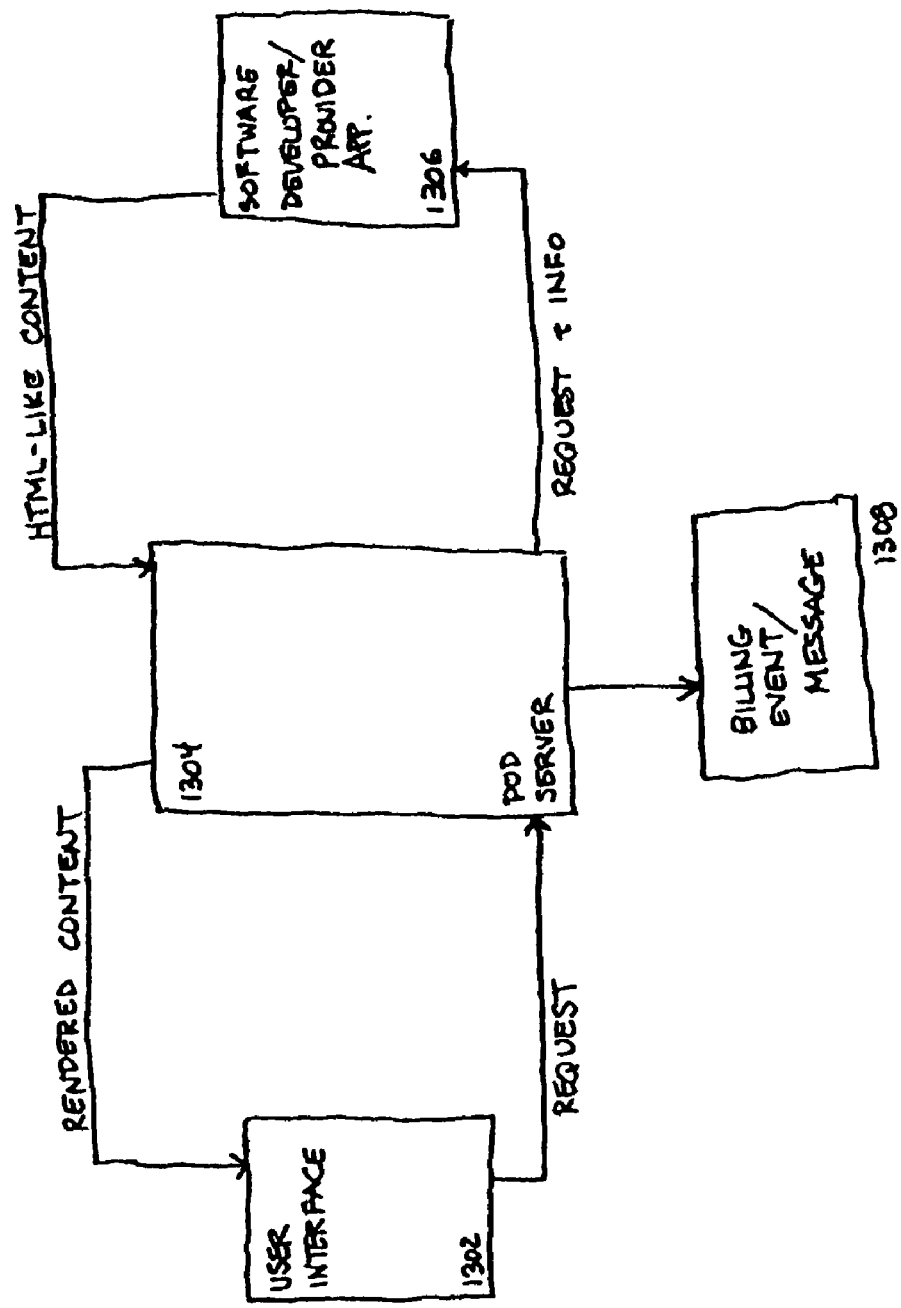
FIG. 13 is a block diagram for explaining the operation of a network-enabled application, according to one embodiment of the invention.

FIGS. 12 and 13 illustrate the operation of a pod and its associated application server with respect to platform 202. As known to one of ordinary skill, and referring in particular to FIG. 13, the pod server 1304 may be a process executing on a separate, dedicated processor or may be included as part of the user area 304 or the developer's interface 306. In step 1202, a user interacts with some feature on the pod user interface 1302 to generate a request. This request, includes the URL associated with the content of the pod and a query string (if any) based on the fields of the pod, and information input by the user. The query string can be referred to as transient parameters.

In response to the request from the pod user interface, 1302, the pod server 1304 identifies the pod developer server and the URL of the content and adds some additional information, in step 1204. The augmented request is sent to the application provider's application server 1306 which responds, in step 1204, to the augmented request.

In the previously mentioned incorporated by reference document, exemplary types of augmented information are described in detail. In general terms, the information added to the augmented request includes demographic information about the owner and viewer of the pod. In this way, the application server 1306 can respond with a first type of content if the owner and viewer are the same or respond with different content if the owner and viewer are different. One way to accomplish this distinction is for the user area 304 to refer to users by a unique user ID number. Thus, users can be distinguished without revealing sensitive information to an application developer such as the mobile telephone number of a user. Also, the application server 1306 can use this demographic information to collect statistics about its users.

Other additional information that might be added would include details about the type of user interface the user has available. Because users may be using their mobile device, their display may not be as robust as a desktop interface. Thus, application server 1306 can control content based on the current graphical and bandwidth capabilities of the user. For example, the additional information can indicate whether the user is operating in a web-based or WAP-based environment.

In response to the augmented request, the application server 1306 responds with code, in step 1206, that is substantially HTML data. This code is generated according to the application logic of the application server 1306. In other words, it is the content that is returned to the user who is viewing the pod. In certain embodiments of the present invention, the code of the response varies from conventional HTML in certain ways. For example, because this is a managed communication system, non-standard HTML tags can be used and supported. Thus, non-standard tags can be used that are specific to the pod environment that are not applicable to generic HTML pages. For example, a pod has a title area and a message area. Tags specifically for controlling these areas may be used to add functionality to the pod environment described herein. One of ordinary skill will recognize that a number of different specialized tags and capabilities can be offered without departing from the scope of the present invention.

An additional variation from HTML is that of using templates where information can be provided by the pod server 1304. For example, for privacy concerns, little identifying information is sent to the application server 1306. However, the pod server 1304 has access to this information because it communicates with the user information stored in the user area 304. Thus, the use of templates will allow application server 1306 to take advantage of this information to personalize the pod experience. For example, the template may include a tag <! FirstName !>. When the pod server 1304 encounters this tag in the template, it knows that the application server 1306 intends for the pod server to insert the first name of the user. A more detailed list of exemplary template tags is provided in the previously mentioned incorporated by reference document.

When the pod server 1304 receives the HTML-like reply from the application server 1306, the pod server manipulates the reply into a format useful for the pod environment. For example, certain HTML features such as, for example, javascript, iframe, frame, and script features, are removed from the reply in order to improve the security of the content. Secondly, the pod server 1304 can replace the personalizable parameters in the templates with the actual user information. And thirdly, the pod server 1304 can translate the content into other display formats, depending on the operating environment of the user (mobile or computer).

For example, if an application provider is well-skilled in providing WAP code as opposed to conventional HTML code, then that provider can control which code, or content, is generated based on the information it knows about the user's interface. However, if an application provider is not skilled with, or does not support, generating content in different formats, then the application can request (as part of the code it sends back to the pod server 1304) that the pod server 1304 translate the code into a more appropriate format.

Another modification the pod server 1304 can make is that of manipulating the hyperlinks within the code sent by the application provider. Under normal behavior, such a hyperlink would result in opening another browser window and following the link. As is known to one skilled in this area, the original hyperlinks are adjusted by the pod server 1304 so that pages rendered by following the links remain under the control of the pod server 1304 and the user interface remains within the focus of the pod instead of some other browser window.

Once the pod server 1304 completes its changes to the original code in step 1208, the pod server 1304 renders the code and content to the user's pod 1302, in step 1212.

In addition to the code that is received from the developer's application server 1306, the pod server 1304 can also receive information from the application server 1306 about a billing event that should be triggered for the particular content that the user requested. For example, the user may have requested a stock quote that will cost $1.00. When application server 1306 generates the content of the reply (e.g., when application server 1306 transmits the data corresponding to the stock quote to the mobile device of the user), it also generates a message that the pod user should be charged $1.00 for this transaction. One of ordinary skill will appreciate that there is wide variety of protocols for the pod server 1304 and the application server 1306 to exchange information related to a billable transaction. During operation, therefore, the developer's application server 1306 merely adheres to the agreed upon protocols to inform the pod server 1304 that a billable transaction has occurred.

When the pod server 1304 determines that the code from the application server 1306 includes an indication that billing should occur, the pod server 1304 generates a billing event 1308, in step 1210. This billing event 1308 is forwarded to the developer's interface 306 so that billing may occur by using the wireless network carrier's underlying billing systems. In alternative embodiments, the billing event can be handled by developer's interface 306 to achieve payment through any one of a variety of billing mechanisms, such as prepaid card services, web-based payment services, bank account and credit card billing services, and other such external billing mechanisms that support customer transactions. The pod server 1304 has access to the recipient information (i.e., the pod user) and the billing rate of the application supported by application server 1306. Therefore, an appropriately formatted billing message is easily generated.

Figure 14:
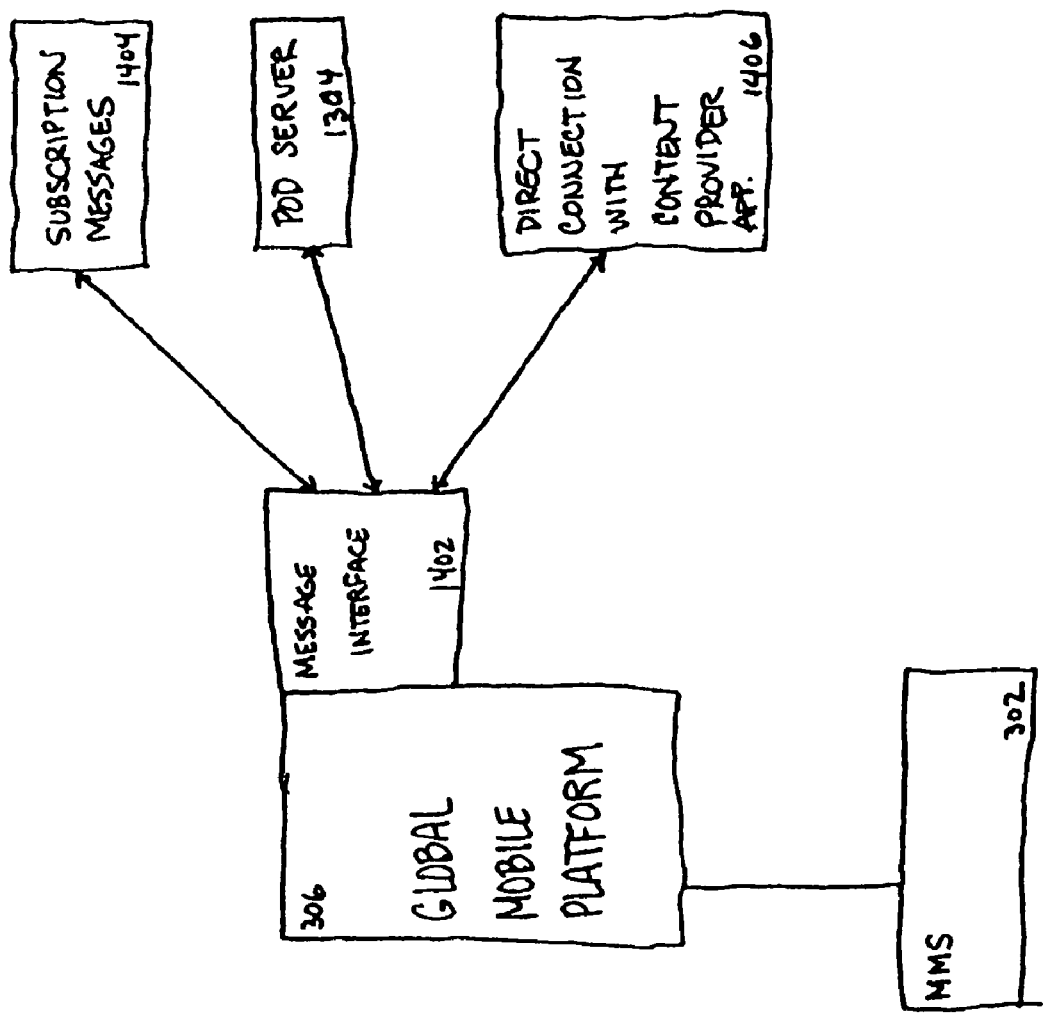
FIG. 14 is a block diagram for explaining the operation of a network-enabled application, according to another embodiment of the invention.

Referring to FIG. 14, the developer's interface 306 includes a message interface 1402 to handle billing events from a variety of sources. Although a different interface could be designed for each different source of billing events, it is more efficient to use a single application programming interface (API). The use of a single API is exemplary in nature and is not intended to restrict or limit the different ways that the developer's interface 306 can exchange messages.

One type of billing message originates from subscription-based services. Under these circumstances, a database or other storage system maintains a record of when to send a message to a user on a predetermined periodic basis (e.g., daily, monthly, weekly, etc.). When the management system for these subscription services indicate that a message is to be sent, then this message is forwarded to the interface 1402 of the developer's interface 306 with the appropriate tariff information included.

As discussed earlier, the pod server 1304 can also generate a message based on a discrete billable event occurring due to the user's operation or use of an application. In this instance the billing message 1308 is forwarded to the interface 1402.

In another circumstance, the application may operate so as to avoid sending content back through the pod server 1304 but still be designed to perform a billable event. For example, the application may be a virtual greeting card application that sends text messages to people based on whether it is their birthday, anniversary, etc. and charges the pod user $0.25 for each card. Thus, the application server 1306 performs billable activities but not via the content it sends back through the pod server 1304. Under these event-based circumstances, the application provider can establish a direct connection with the interface 1402 and send a billable message via the established interface.

Regardless of how the billable event arrives at the interface 1402, the developer's interface 306 processes it such that a message is sent via the MMS 302 through the wireless network carriers to the user of the pod. This message, the content of which may say, for example, "Thank you for being a valued customer of xxx" will have associated with it a tariff code that results in the user being billed via their wireless network service account.

Thus, a business model is established where platform 202 directs a wireless network carrier to bill a user for a billing event generated by the user's use of an application, and then the revenue from that billing is shared in an agreed-upon portion with platform 202 which, in turn, shares an agreed-upon portion of that billing with the application provider. The wireless network carrier benefits from additional billable data traffic and the application provider benefits by obtaining instant access to all the users of the platform as well as instant access to the wireless network carriers' billing systems in a seamless and unified fashion through the platform. As mentioned above, other versions of the billing model can use other billing mechanisms rather than billing the user through the wireless network carrier of the user, such as prepaid card services, web-based payment services, bank account and credit card billing services, and other such external billing mechanisms to support customer transactions.

The presence of the developer's interface 306 between the application provider's application 1306 and the MMS 302 provides the benefit that the messaging of different users of the platform 202 can be controlled to ensure the platform 202 is more enjoyable.

Within the platform architecture, the various computer-based components discussed thus far have a vast amount of information stored and readily accessible. For example some of the information includes: identifying information about each application, identifying information about each user, identifying information about which pods are associated with each user, information about the terms and conditions regulating the operations of an application, and information about messages being sent via the platform 202. With this information available, one of ordinary skill will recognize that a number of operating parameters of the platform 202 can be monitored and controlled.

Figure 15:
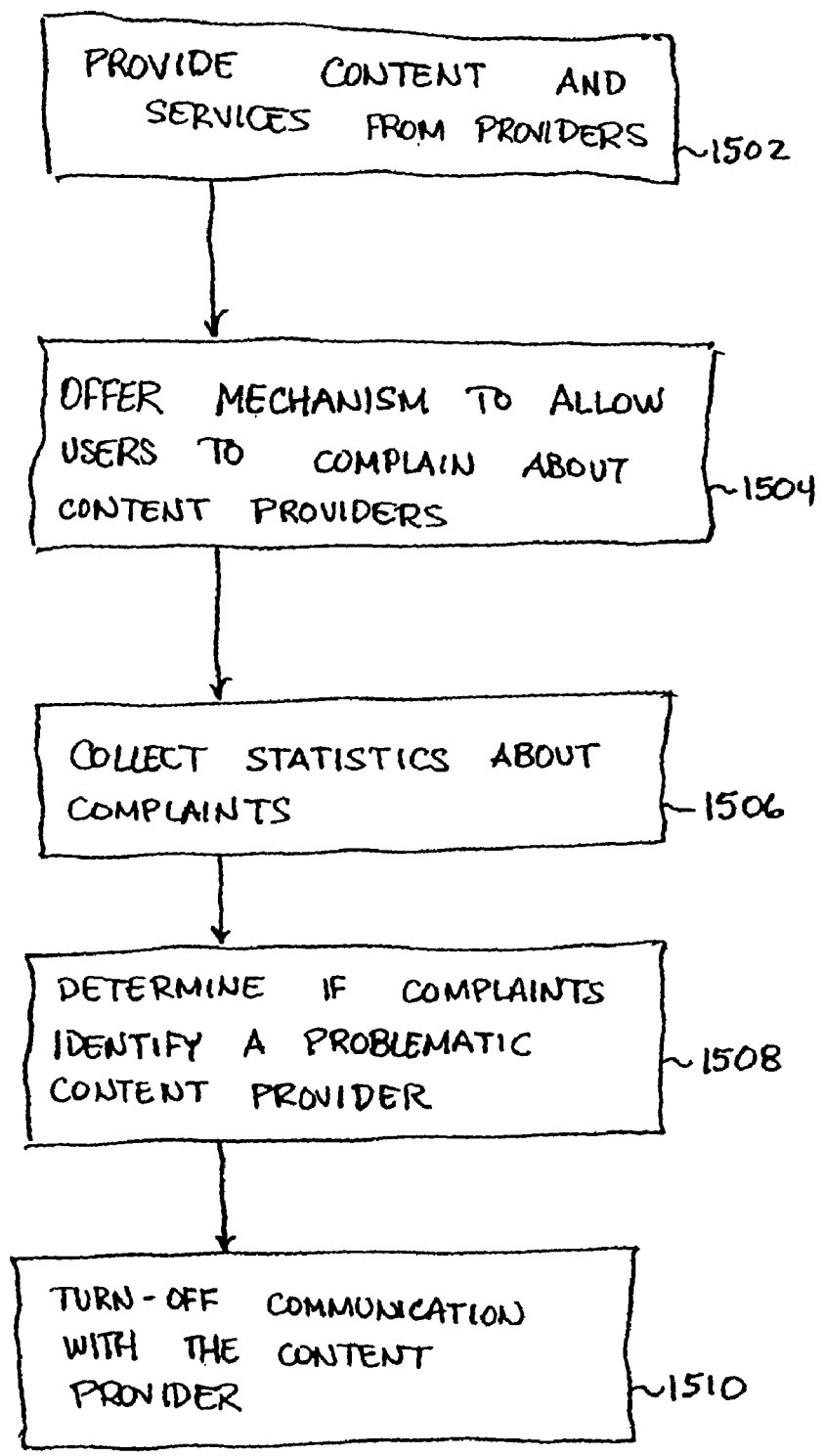
FIG. 15 is a flowchart for explaining the control of a network-enabled application based on user complaints, according to one embodiment of the invention.

FIG. 15 depicts a flowchart of an exemplary method for instituting a complaint monitoring program within the platform 202, which can ultimately result in automatic cut-off of access to, and billing activities by, an application. In accordance with this flowchart, while all the parties are using the platform 202, content and services are being provided by different application providers in step 1502. Within the profile page of a user, or alternatively at a more centrally located webpage operated by platform 202, a link may be provided, in step 1504, to submit a complaint. The developer's interface 306 then collects these complaints and generates, in step 1506, statistics about them. For example, one statistic may be to identify what percentage of users of an application are complaining that it fails to operate as promised, provides unsuitable material, improperly bills, or includes some other problem.

In step 1508, the complaint statistics are evaluated to determine if a problem exists. Typically there would be checks and balances used to ensure that a single user is not abusing the system with a flood of complaints or that 100 complaints is not really a problem if the user base is 10 million. If a problem is found to exist with a particular application, which can be determined if the received complaints for that application exceed a predetermined threshold, then in step 1510, the developer's interface turns off communication between that application and platform 202. Thus, the pod server of platform 202 can be informed to ignore any communications to or from that particular application. Because an application provider may supply more than one application, an embodiment is provided in which the system turns off communication with all applications from that provider, not simply the ones relating to only the problematic application.

Figure 16:
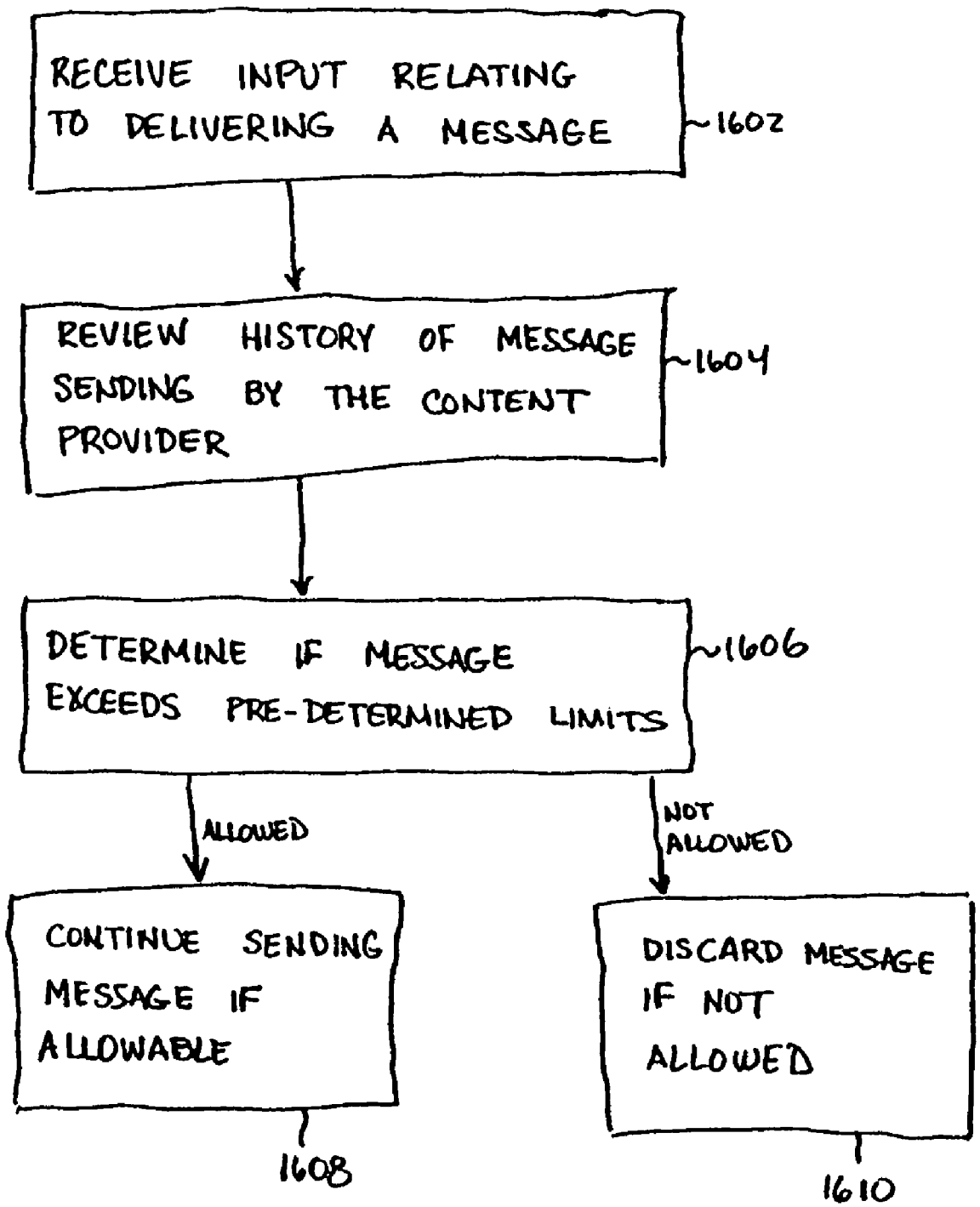
FIG. 16 is a flowchart for explaining the control of a network-enabled application based on a predetermined pricing structure, according to one embodiment of the invention.

FIG. 16 provides a flowchart of an exemplary method for regulating messages such that the agreed upon terms and conditions of the operating parameters of the pricing structure for an application are adhered to. At the time a subscriber decides to subscribe to an application, the subscriber is shown details relating to price, message frequency, maximum messages sent to the user in any given time period, and other terms relating to the specific application. Upon agreeing to those terms and conditions, those terms and conditions are memorialized for that specific subscriber within the platform, such that if the application provider later changes the price or other terms of the service, such new terms will only apply to the new subscribers that enter a "contract" after the date of change. The system ensures enforcement of the original terms and conditions that each individual subscriber was shown and agreed to during subscription to the application.

In step 1602, the developer's interface 306 receives via its interface 1402 a message from an application developer's application server to send to a user. As part of the agreed upon interface, the message arrives from an identifiable source and specifies the recipients for the message. A recipient can be a single user or it could be a group such as "San Diego Padre fans" which the system will expand into the individual subscribers when delivering the message.

Thus, in step 1604, the developer's interface analyzes historical information about messages sent by this application sender to the specified recipient. In step 1606, this historical data can be compared to the pre-defined threshold limits for the application message sender. If the message would cause the pre-determined limits to be exceeded for that application, then the message is discarded in step 1610 thereby avoiding billing of the user. If the message is allowable, then the message is sent to the user as normal in step 1608.

At least portions of the invention can be implemented on a networked computing system via a network, such as the Internet. An example of such a networked system is described in FIG. 1. The description of the network and computer-based platforms that follows is exemplary. However, it should be clearly understood that the present invention may be practiced without the specific details described herein. Well known structures and devices are shown in block diagram form in order to avoid unnecessarily obscuring the present invention.

Figure 1:
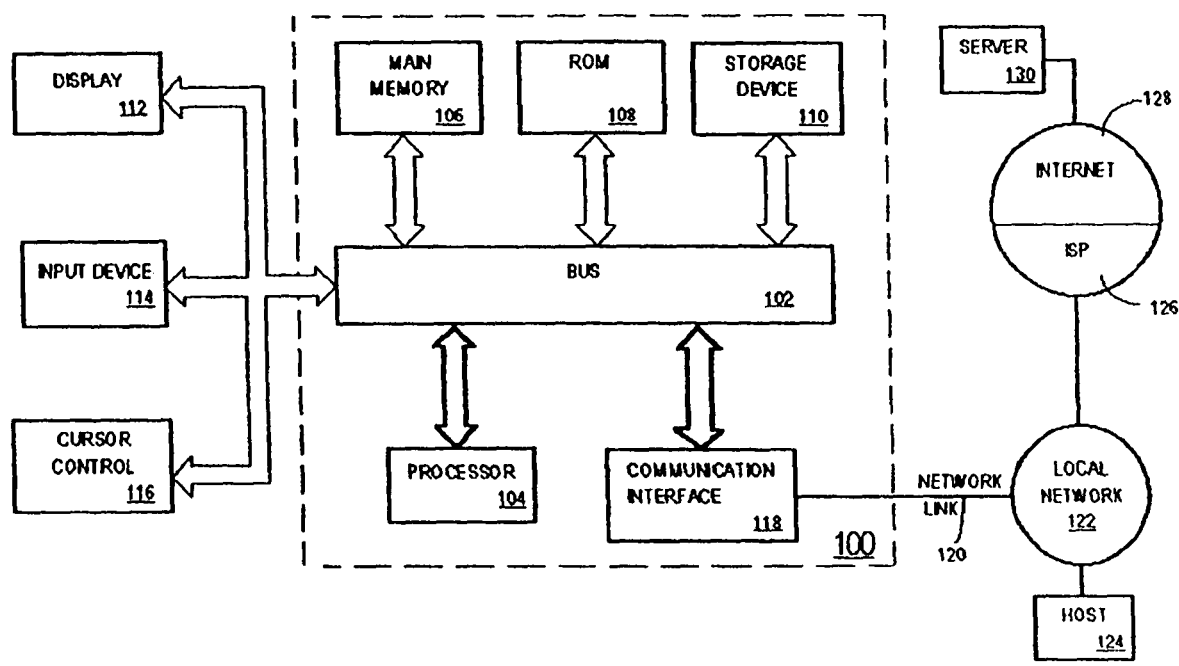
FIG. 1 is a block diagram of a computer system with which the present invention may be practiced, according to one embodiment of the invention.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

Computer system 100 operates in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented, such as those implemented via cellular or wireless networks, Bluetooth systems, optical systems, and other forms of wireless communications. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. The received code may be executed by processor 104 as it is received, and/or stored in storage device 110, or other non-volatile storage for later execution. In this manner, computer system 100 may obtain application code in the form of a carrier wave. Of course, other types and forms of a computing system may be used to practice the invention.

As mentioned, a developer can create and develop a pod application in a number of different ways using any of a variety of different development languages and environments. While different pod applications may accomplish many different purposes, there are certain functions that many pods will have in common. For example, sending an e-mail message or a text message to a recipient may be a common function shared amongst diverse pod applications. Also, building a query string for a database or forwarding a media file to a rendering engine are some functions that many different pod applications will likely include as well. Thus, the availability of libraries of re-usable code may advantageously be provided within one or more implementations of the system described herein. For example, referring to FIG. 3, a set of libraries 301 is provided to developers who log into the pod application development system. The developer may locate within the libraries of code 301 (in any one of many different languages) one or more previously developed functions or code-segments which pertain to a pod application the developer is designing. Once located, these code segments can then be downloaded by the developer and used, and re-used, in the development of pod applications. In one embodiment of the present invention, the developer libraries 301 may also allow developers to upload their own code to further widen the variety of available libraries for downloading by other developers. Appropriate security and code checking would likely be implemented to ensure unsafe or malicious code was not uploaded to the developer libraries 301.

In FIG. 3, the developer libraries 301 are shown as a logical block available through the Global Mobile Platform 306. This depiction is exemplary in nature and one of ordinary skill will recognize that the libraries 301 may be provided in a variety of different storage formats, computer platforms, and interconnected systems without departing from the scope of the present invention.

Using the developer's own resources as well as the available developer libraries 301, a developer can design various pods such as a pod to share music and/or alert users about the availability of new music. In addition to music, other media files such as video and more textual messages may be shared as well. An example of such a pod application is provided in Appendices D and E of the provisional patent application incorporated by reference above. The series of slides in Appendix D outlines the development process, including the use of developer libraries 301, in building the music pod application. The source code of Appendix E describes a specific implementation of the music pod application in a PHP-like language. Other development languages such as C#, ASP, Perl, C++, etc, may be used as well.

Appendix C of the provisional patent application incorporated by reference above includes an exemplary SDK for developing pod applications.

The pages appended to this description illustrate various code snippets for corresponding elements of exemplary developer libraries.

In the above description of the various aspects of the present invention, the specific example of an application was described in detail. This specific example was provided merely to highlight many of the features and aspects of the present invention but one of ordinary skill will recognize that providers of other types of products and services may also utilize and benefit from the platform system. In particular, embodiments of the present invention allow application vendors to charge for all types of products and/or services via the platform's pre-existing connectivity to the various wireless network carrier systems. In practice, a user consummates a transaction with a vendor through an application for some product or service and, in the process, provides to the vendor a means of identifying that user within the platform. The vendor, in turn, will communicate with the platform (e.g., via the Mobile Global Platform) to initiate a billing event that identifies the purchaser and the transaction amount. As explained above, this billing event will result in the platform triggering the user's wireless network subscriber account to bill the user accordingly for the transaction amount. In this way, the mobile phone account (although this information is not necessarily revealed to the vendor) acts as a virtual wallet allowing the purchaser to easily pay for a variety of different types of transactions through the use of applications. In other embodiments, as mentioned above, other billing mechanisms can be used by the platform rather than billing the user through the wireless network carrier of the user, such as prepaid card services, web-based payment services, bank account and credit card billing services, and other such external billing mechanisms to support customer transactions.

The previous description is provided to enable any person skilled in the art to practice the various embodiments described herein. Various modifications to these embodiments will be readily apparent to those skilled in the art, and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more". All structural and functional equivalents to the elements of the various embodiments described throughout this disclosure that are known or later come to be known to those of ordinary skill in the art are expressly incorporated herein by reference and intended to be encompassed by the claims. Moreover, nothing disclosed herein is intended to be dedicated to the public regardless of whether such disclosure is explicitly recited in the claims.

What is claimed is:

1. A method for developing and integrating a network-enabled application with a platform having a plurality of remote users, the method comprising:

a user area establishment step of establishing, on the platform, a user area associated with a user;

an application access step of making a plurality of networked-enabled applications available in or through the platform via the user area and allowing the user the ability to place one of the plurality of networked-enabled applications on the user area and to access or use the network-enabled application on or through the user area;

a request receipt step of receiving, at the platform, a request from a third-party provider to integrate a network-enabled application with the platform;

a registration data receipt step of receiving, at the platform, a set of registration data corresponding to the network-enabled application from the third-party provider, the set of registration data including a link to an application location for accessing the network-enabled application and network interface information specifying elements of a network interface that is generated by the platform for the network-enabled application;

a database update step of updating a system database in the platform to include the set of registration data corresponding to the network-enabled application;

a development step of integrating at least one function or code-segment from a developer library associated with the platform into the network-enabled application; and an enablement step of enabling the network-enabled application to communicate with the plurality of remote users via the network interface.

2. A method according to claim 1, wherein, in the request receipt step, the request is received from the third-party provider through a user interface operated by the platform.

3. A method according to claim 2, wherein the user interface is a webpage.

4. A method according to claim 2, wherein the user interface is an application downloaded from the platform.

5. A method according to claim 2, wherein the user interface includes access to the developer library.

6. A method according to claim 1, wherein, the developer library includes functions or code-segments relating to sending an email message, sending a text message, building a query string, forwarding a media file, or logging in.

7. A method according to claim 1 wherein the developer library is provided by the platform or by another user.

8. A method according to claim 1, wherein the platform includes an application interface platform and wherein, in the enablement step, the network-enabled application is integrated with the platform via the application interface platform.

9. A method according to claim 1, wherein, in the enablement step, the networked interface is an application webpage that is operated by the platform and that includes an application identifier corresponding to the network-enabled application.

10. A method according to claim 1, wherein, in the enablement step, the networked interface includes an application that is downloadable from the platform to at least one mobile device.

11. A method according to claim 1, wherein the network-enabled application is selected from the group consisting of music data, video data, plaintext data or markup language data.

12. A method according to claim 1, wherein the media file is a video file, an audio file, or a combination of both.

13. A platform for supporting a network-enabled application, comprising:
   at least one processor;
   at least one interface having access to the internet; and
   at least one computer readable medium carrying one or more sequences of instructions for integrating the network-enabled application with the platform, wherein execution of the one or more sequences of instructions by the one or more processors
   causes the one or more processors to perform:
      a user area establishment step of establishing, on the platform, a user area associated with a user;
      an application access step of making a plurality of networked-enabled applications available in or through the platform via the user area and allowing the user the ability to place one of the plurality of networked-enabled applications on the user area and to access or use the network-enabled application on or through the user area;
      a request receipt step of receiving, at the platform, a request from a third-party provider to integrate the network-enabled application with the platform;
      a registration data receipt step of receiving, at the platform, a set of registration data corresponding to the network-enabled application from the third-party provider, the set of registration data including a link to an application location for accessing the network-enabled application and network interface information specifying elements of a network interface that is generated by the platform for the network-enabled application;
      a pricing structure data receipt step of receiving, at the platform, a set of pricing structure data corresponding to the network-enabled application from the third party provider;
      a database update step of updating a system database in the platform to include the set of registration data corresponding to the network-enabled application and to include the pricing structure data corresponding to the network-enabled application;
      a development step of integrating at least one function or code-segment from a developer library associated with the platform into the network-enabled application; and
      an enablement step of enabling the network-enabled application to communicate with the plurality of remote users via a networked interface operated by the platform.

14. A platform according to claim 13, wherein, in the request receipt step, the request is received from the third-party provider through a webpage operated by the platform.

15. A platform according to claim 13, wherein, in the registration data receipt step, the set of registration data is received from the third-party provider through a registration webpage operated by the platform.

16. A platform according to claim 13, wherein the platform includes an application interface platform and wherein, in the enablement step, the network-enabled application is integrated with the platform via the application interface platform.

17. A platform according to claim 13, wherein, in the enablement step, the networked interface is an application webpage that is operated by the platform and that includes an application identifier corresponding to the network-enabled application.

18. A platform according to claim 13, wherein, in the enablement step, the networked interface includes an application that is downloadable from the platform to at least one mobile device.

19. A platform according to claim 13, wherein execution of the one or more sequences of instructions by the one or more processors causes the one or more processors to further perform a statistics collecting step of collecting statistics regarding one or more of the plurality of users who access the network-enabled application.

20. A platform according to claim 13, wherein the network-enabled application is selected from the group consisting of music data, video data, plaintext data or markup language data.

21. A platform according to claim 13, wherein, the developer library includes functions or code-segments relating to sending an email message, sending a text message, building a query string, forwarding a media file, or logging in.

22. A platform according to claim 13 wherein the developer library is provided by the platform or by another user.

23. A method according to claim 1, wherein the network interface is provided to a user using at least one of the plurality of communication channels, and the platform obtains user input from the network interface and communicates the input to the network-enabled application.

24. A method according to claim 1, wherein the platform operates a remote location from the plurality of users.

25. A platform according to claim 13, further comprising a plurality of communication channels to a respective plurality of wireless network carriers, each of the wireless network carriers having a plurality of users.

* * * * *